US012127290B2

(12) United States Patent
Kim

(10) Patent No.: US 12,127,290 B2
(45) Date of Patent: Oct. 22, 2024

(54) METHOD AND APPARATUS FOR PERFORMING CONNECTION RESUMPTION IN WIRELESS COMMUNICATION SYSTEM

(71) Applicants: BLACKPIN Inc., Seoul (KR); SIGNALIS CO., LTD., Daejeon (KR); Soenghun Kim, Hanam-si (KR)

(72) Inventor: Soenghun Kim, Hanam-si (KR)

(73) Assignees: BLACKPIN Inc., Seoul (KR); Soenghun Kim, Hanam-si (KR); SIGNALIS CO., LTD., Daejeon (KR)

( * ) Notice: Subject to any disclaimer, the term of this patent is extended or adjusted under 35 U.S.C. 154(b) by 0 days.

(21) Appl. No.: 18/638,681

(22) Filed: Apr. 18, 2024

(65) Prior Publication Data

US 2024/0267979 A1    Aug. 8, 2024

Related U.S. Application Data

(63) Continuation of application No. 18/372,654, filed on Sep. 25, 2023.

(30) Foreign Application Priority Data

Sep. 26, 2022    (KR) .................... 10-2022-0121385

(51) Int. Cl.
*H04W 76/20*    (2018.01)
*H04W 76/19*    (2018.01)

(52) U.S. Cl.
CPC .......... *H04W 76/20* (2018.02); *H04W 76/19* (2018.02)

(58) Field of Classification Search
CPC ............................. H04W 76/20; H04W 76/19
See application file for complete search history.

(56) References Cited

U.S. PATENT DOCUMENTS

2021/0126747 A1*    4/2021    Kim ................. H04W 74/0833
2021/0168896 A1*    6/2021    Wang ................... H04W 76/15
(Continued)

FOREIGN PATENT DOCUMENTS

WO    2022154637    7/2022
WO    2022187134    9/2022
WO    2022192124    9/2022

OTHER PUBLICATIONS

3GPP TS 36.331 V17.1.0 (Jun. 2022); Technical Specification; 3rd Generation Partnership Project; Technical Specification Group Radio Access Network; Evolved Universal Terrestrial Radio Access (E-UTRA);Radio Resource Control (RRC);Protocol specification (Release 17).

(Continued)

*Primary Examiner* — Parth Patel
(74) *Attorney, Agent, or Firm* — PnK IP LLC

(57) ABSTRACT

A method and apparatus for performing connection resumption is provided. The method includes transmitting UECapabilityInformation to the base station, The UECapabilityInformation includes type 1 SDT support information and type 2 SDT support information, transmitting a message containing the UE NETWORK CAPACITY to the AMF, Specific bits in the UE NETWORK CAPABILITY indicate whether RRC CONNECTION RESUME3 is supported, receiving an RRCRelease from the base station, The RRCRelease comprises a SuspendConfig, In response to receiving said RRCRelease message, entering the RRC_INACTIVE state and performs cell selection, monitoring the paging channel in the selected cell, and initiating RRC CONNECTION RESUME3 or RRC CONNECTION RESUME1 upon receiving a first paging message or a second paging message.

20 Claims, 8 Drawing Sheets

(56) References Cited

U.S. PATENT DOCUMENTS

| | | | |
|---|---|---|---|
| 2022/0014955 A1* | 1/2022 | Yang | H04W 76/27 |
| 2022/0022247 A1 | 1/2022 | Agiwal et al. | |
| 2023/0101796 A1* | 3/2023 | Pu | H04L 5/001 |
| | | | 455/522 |
| 2023/0189268 A1* | 6/2023 | Kim | H04W 72/21 |
| | | | 370/329 |
| 2023/0217306 A1* | 7/2023 | Kim | H04L 69/24 |
| | | | 370/329 |
| 2023/0217398 A1* | 7/2023 | Kim | H04B 7/06964 |
| | | | 370/503 |
| 2024/0023193 A1* | 1/2024 | Kim | H04L 69/28 |
| 2024/0080915 A1* | 3/2024 | Kim | H04W 88/02 |
| 2024/0107616 A1* | 3/2024 | Kim | H04W 76/15 |

OTHER PUBLICATIONS

3GPP TS 36.321 V17.1.0 (Jun. 2022) ; Technical Specification; 3rd Generation Partnership Project; Technical Specification Group Radio Access Network; NR; Evolved Universal Terrestrial Radio Access (E-UTRA); Medium Access Control (MAC) protocol specification (Release 17).

3GPP TS 38.331 V17.1.0 (Jun. 2022); Technical Specification; 3rd Generation Partnership Project; Technical Specification Group Radio Access Network; NR; Radio Resource Control (RRC) protocol specification (Release 17).

3GPP TS 38.321 V17.1.0 (Jun. 2022); Technical Specification; 3rd Generation Partnership Project; Technical Specification Group Radio Access Network; NR; Medium Access Control (MAC) protocol specification (Release 17).

3GPP TS 38.323 V17.1.0 (Jun. 2022); Technical Specification; 3rd Generation Partnership Project; Technical Specification Group Radio Access Network; NR; Packet Data Convergence Protocol (PDCP) specification (Release 17).

3GPP TS 38.306 V17.1.0 (Jun. 2022); Technical Specification; 3rd Generation Partnership Project; Technical Specification Group Radio Access Network; NR; User Equipment (UE) radio access capabilities (Release 17).

3GPP TS 38.211 V17.3.0 (Sep. 2022); Technical Specification; 3rd Generation Partnership Project; Technical Specification Group Radio Access Network; NR; Physical channels and modulation (Release 17).

3GPP TS 38.212 V17.3.0 (Sep. 2022); Technical Specification; 3rd Generation Partnership Project; Technical Specification Group Radio Access Network; NR; Multiplexing and channel coding(Release 17).

3GPP TS 38.213 V17.3.0 (Sep. 2022); Technical Specification; 3rd Generation Partnership Project; Technical Specification Group Radio Access Network; NR; Physical layer procedures for control (Release 17).

3GPP TS 38.214 V17.3.0 (Sep. 2022); Technical Specification; 3rd Generation Partnership Project; Technical Specification Group Radio Access Network; NR; Physical layer procedures for data (Release 17).

3GPP TS 38.306 V17.2.0 (Sep. 2022); Technical Specification; 3rd Generation Partnership Project; Technical Specification Group Radio Access Network; NR; User Equipment (UE) radio access capabilities (Release 17).

3GPP TS 38.331 V17.2.0 (Sep. 2022); Technical Specification; 3rd Generation Partnership Project; Technical Specification Group Radio Access Network; NR; Radio Resource Control (RRC) protocol specification (Release 17).

3GPP TS 38.323 V17.2.0 (Sep. 2022); Technical Specification; 3rd Generation Partnership Project; Technical Specification Group Radio Access Network; NR; Packet Data Convergence Protocol (PDCP) specification (Release 17).

3GPP TS 38.321 V17.2.0 (Sep. 2022); Technical Specification; 3rd Generation Partnership Project; Technical Specification Group Radio Access Network; NR; Medium Access Control (MAC) protocol specification (Release 17).

International Search Report for International Patent Application No. PCT/KR2023/014644 dated Jan. 15, 2024.

Ericsson et al., "Correction CR for QoE Measurement Collection in NR", 3GPP TSG-RAN WG2 Meeting #119 R2-2209242, Electronical meeting, Aug. 17-29, 2022.

\* cited by examiner

METHOD AND APPARATUS FOR PERFORMING CONNECTION RESUMPTION IN WIRELESS COMMUNICATION SYSTEM

CROSS-REFERENCE TO RELATED APPLICATION

This application is a continuation of U.S. patent application Ser. No. 18/372,654, filed on Sep. 25, 2023, which claims priority to and the benefit of Korean Patent Application No. 10-2022-0121385, filed on Sep. 26, 2022, the disclosure of which is incorporated herein by reference in its entirety.

BACKGROUND

Technical Field

The present disclosure relates to Radio Resource Control connection resumption in wireless communication system.

Discussion of the Background

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e.g., 60 GHz bands). In order to increase the propagation distance by mitigating propagation loss in the 5G communication system, various techniques have been introduced such as beamforming, massive multiple-input multiple output (MIMO), full dimensional MIMO (FD-MIMO), array antenna, analog beamforming, and large-scale antenna. In addition, base station is divided into a central unit and a plurality of distribute units for better scalability. To facilitate deployment of various services, 5G communication system targets supporting high data rate and low transmission latency.

In order to realize low transmission delay, uplink data transmission and downlink data reception for wireless device in INACTIVE state are required.

SUMMARY

Aspects of the present disclosure are to address the various methods of implementing NR cell access in mobile communication system. According to an aspect of the present disclosure, a method of an apparatus may include transmitting UECapabilityInformation to the base station, the UECapabilityInformation including type 1 SDT support information and type 2 SDT support information, transmitting a message containing the UE NETWORK CAPABILITY to the AMF, specific bits in the UE NETWORK CAPABILITY indicating whether RRC CONNECTION RESUME3 is supported, receiving an RRCRelease from the base station, the RRCRelease including a SuspendConfig. The method may further include, in response to receiving said RRCRelease message, entering into the RRC_INACTIVE state and performing a cell selection, monitoring the paging channel in the selected cell, and initiating RRC CONNECTION RESUME3 or RRC CONNECTION RESUME1 upon receiving a first paging message or a second paging message. A first paging message may be a paging message in which the first UE identifier contained in entry1 of the first list matches the stored first UE identifier of the terminal. The second information may be the paging message contained in the corresponding entry2 of the second list.

DETAILED DESCRIPTION

Figure 1A:
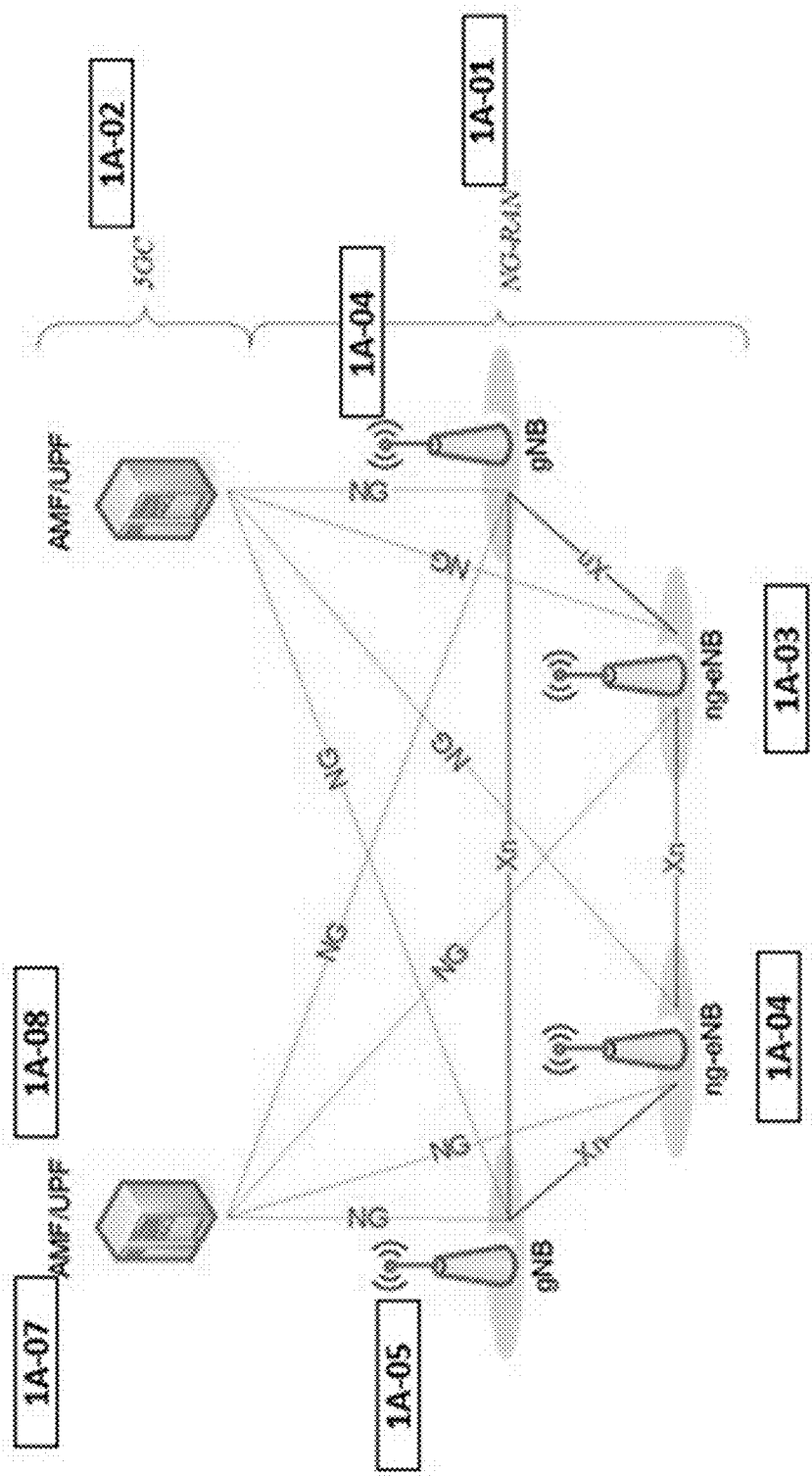
FIG. 1A is a diagram illustrating an example architecture of a 5G system and a NG-RAN to which the disclosure may be applied.

Hereinafter, various examples of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof may be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for the convenience of explanation. However, the present disclosure is not limited by the use of these terms and definitions and other arbitrary terms and definitions may be employed instead.

Table 1 lists the acronyms used throughout the present disclosure.

TABLE 1

| Acronym | Full name | Acronym | Full name |
|---------|-----------|---------|-----------|
| 5GC | 5G Core Network | RACH | Random Access Channel |
| ACK | Acknowledgement | RAN | Radio Access Network |
| AM | Acknowledged Mode | RA-RNTI | Random Access RNTI |
| AMF | Access and Mobility Management Function | RAT | Radio Access Technology |
| ARQ | Automatic Repeat Request | RB | Radio Bearer |

TABLE 1-continued

| Acronym | Full name | Acronym | Full name |
|---|---|---|---|
| AS | Access Stratum | RLC | Radio Link Control |
| ASN.1 | Abstract Syntax Notation One | RNA | RAN-based Notification Area |
| BSR | Buffer Status Report | RNAU | RAN-based Notification Area Update |
| BWP | Bandwidth Part | RNTI | Radio Network Temporary Identifier |
| CA | Carrier Aggregation | RRC | Radio Resource Control |
| CAG | Closed Access Group | RRM | Radio Resource Management |
| CG | Cell Group | RSRP | Reference Signal Received Power |
| C-RNTI | Cell RNTI | RSRQ | Reference Signal Received Quality |
| CSI | Channel State Information | RSSI | Received Signal Strength Indicator |
| DCI | Downlink Control Information | SCell | Secondary Cell |
| DRB | (user) Data Radio Bearer | SCS | Subcarrier Spacing |
| DRX | Discontinuous Reception | SDAP | Service Data Adaptation Protocol |
| HARQ | Hybrid Automatic Repeat Request | SDU | Service Data Unit |
| IE | Information element | SFN | System Frame Number |
| LCG | Logical Channel Group | S-GW | Serving Gateway |
| MAC | Medium Access Control | SI | System Information |
| MIB | Master Information Block | SIB | System Information Block |
| NAS | Non-Access Stratum | SpCell | Special Cell (e.g., a primary cell of a master or secondary cell group) |
| NG-RAN | New Generation Radio Access Network | SRB | Signalling Radio Bearer |
| NR | New Radio Radio Access | SRS | Sounding Reference Signal |
| PBR | Prioritised Bit Rate | SSB | SS/PBCH block |
| PCell | Primary Cell | SSS | Secondary Synchronisation Signal |
| PCI | Physical Cell Identifier | SUL | Supplementary Uplink |
| PDCCH | Physical Downlink Control Channel | TM | Transparent Mode |
| PDCP | Packet Data Convergence Protocol | UCI | Uplink Control Information |
| PDSCH | Physical Downlink Shared Channel | UE | User Equipment |
| PDU | Protocol Data Unit | UM | Unacknowledged Mode |
| PHR | Power Headroom Report | MT-SDT | Mobile Terminated-SDT |
| PLMN | Public Land Mobile Network | MO-SDT | Mobile Originated-SDT |
| PRACH | Physical Random Access Channel | CS-RNTI | Configured Scheduling-RNTI |
| PRB | Physical Resource Block | TAG | Timing Advance Group |
| PSS | Primary Synchronisation Signal | SDT | Small Data Transmission |
| PUCCH | Physical Uplink Control Channel | RA-SDT | Random Access-SDT |
| PUSCH | Physical Uplink Shared Channel | CG-SDT | Configured Grant-SDT |
| PTAG | Primary TAG | STAG | Secondary TAG |

Table 2 lists the terminologies and their definitions used throughout the present disclosure.

TABLE 2

| Terminology | Definition |
|---|---|
| allowedCG-List | List of configured grants for the corresponding logical channel. This restriction applies only when the UL grant is a configured grant. If present, the UL MAC SDUs from this logical channel can only be mapped to the indicated configured grant configuration. If the size of the sequence is zero, then the UL MAC SDUs from this logical channel cannot be mapped to any configured grant configurations. If the field is not present, the UL MAC SDUs from this logical channel can be mapped to any configured grant configurations. |
| allowedSCS-List | List of allowed sub-carrier spacings for the corresponding logical channel. If present, the UL MAC SDUs from this logical channel can only be mapped to the indicated numerology. Otherwise, the UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, the UL MAC SDUs from this logical channel can be mapped to any configured serving cell of this cell group. |
| Carrier frequency | center frequency of the cell. |
| Cell | A combination of downlink and optionally uplink resources. The linking between the carrier frequency of the downlink resources and the carrier frequency of the uplink resources is indicated in the system information transmitted on the downlink resources. |
| Cell Group | A group of serving cells. For example, in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on a DCCH logical channel between the network and a single UE. |
| discardTimer | Timer to control the discard of a PDCP SDU. Starting when the SDU arrives. Upon expiry, the SDU is discarded. |
| F | The Format field in the MAC subheader indicates the size of the Length field. |
| Field | The individual contents of an information element are referred to as fields. |
| Frequency layer | A set of cells with the same carrier frequency. |
| Global cell identity | An identity to uniquely identify a cell (e.g., an NR cell). It is consisted of a cellIdentity and plmn-Identity of the first PLMN-Identity in plmn-IdentityList in SIB1. |

TABLE 2-continued

| Terminology | Definition |
| --- | --- |
| gNB | A node providing a user plane (e.g., NR user plane) and control plane protocol terminations towards a UE and connected via the NG interface to the 5GC. |
| Handover | A procedure that changes the serving cell of a UE (e.g., in RRC_CONNECTED). |
| Information element | A structural element containing single or multiple fields is referred as information element. |
| L | The Length field in the MAC subheader indicates the length of the corresponding MAC SDU or of the corresponding MAC CE |
| LCID | 6 bit logical channel identity in the MAC subheader to denote which logical channel traffic or which MAC CE is included in the MAC subPDU |
| MAC-I | Message Authentication Code — Integrity. A 16 bit or 32 bit bit string calculated by NR Integrity Algorithm based on the security key and various fresh inputs |
| Logical channel | A logical path between an RLC entity and a MAC entity. There are multiple logical channel types depending on what type of information is transferred e.g., CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List, etc. |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by a corresponding LCID. A MAC CE and a corresponding MAC sub-header comprises MAC subPDU |
| Master Cell Group | In MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | The process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH S Cell | A Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | The primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |

TABLE 2-continued

| Terminology | Definition |
| --- | --- |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below.<br>The current KgNB and KRRCint keys, the ROHC state, the stored QoS flow to DRB mapping rules, the C-RNTI used in the source PCell, the cellIdentity and the physical cell identity of the source PCell, the spCellConfigCommon within Reconfiguration WithSync of the NR PSCell (if configured) and all other parameters configured except for:<br>parameters within ReconfigurationWithSync of the PCell;<br>parameters within Reconfiguration WithSync of the NR PSCell, if configured;<br>parameters within MobilityControlInfoSCG of the E-UTRA PSCell, if configured;<br>servingCellConfigCommonSIB; |
| TAG | A group of Serving Cells that is configured by RRC and that, for the cells with a UL configured, using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs. |

In the present disclosure, "trigger" or "triggered" and "initiate" or "initiated" may be used interchangeably.

In the present disclosure, "radio bearers allowed for SDT", "radio bearers for which SDT is configured", and "radio bearers for which SDT is enabled" may be used interchangeably.

In the present disclosure, terminal and UE may be used interchangeably. In the present disclosure, base station and NG-RAN node and GNB may be used interchangeably.

FIG. 1A is a diagram illustrating an example architecture of an 5G system and a NG-RAN to which the disclosure may be applied.

The 5G system may include NG-RAN 1A-01 and 5GC 1A-02. An NG-RAN node may be either:
 a gNB, providing NR user plane and control plane protocol terminations towards one or more UEs; or
 an ng-eNB, providing E-UTRA user plane and control plane protocol terminations towards one or more UEs.

The gNBs 1A-05 or 1A-06 and ng-eNBs 1A-03 or 1A-04 may be interconnected with each other (e.g., via the Xn interface). The gNBs and ng-eNBs may also be connected via the NG interfaces to the 5GC (e.g., to the AMF (Access and Mobility Management Function) and to the UPF (User Plane Function)). AMF 1A-07 and UPF 1A-08 may be implemented as a physical node or as separate physical nodes.

The gNBs 1A-05 or 1A-06 or the ng-eNBs 1A-03 or 1A-04 may host the functions listed below.

The functions for Radio Resource Management such as Radio Bearer Control, Radio Admission Control, Connection Mobility Control, Dynamic allocation of resources to UEs in uplink, downlink and sidelink (scheduling); and
 IP and Ethernet header compression, uplink data decompression and encryption of user data stream; and
 Selection of an AMF at UE attachment when no routing to an MME can be determined from the information provided by the UE; and
 Routing of User Plane data towards UPF; and
 Scheduling and transmission of paging messages; and
 Scheduling and transmission of broadcast information (originated from the AMF or O&M); and
 Measurement and measurement reporting configuration for mobility and scheduling; and
 Session Management; and
 QoS Flow management and mapping to data radio bearers; and
 Support of Ues in RRC_INACTIVE state; and
 Radio access network sharing; and
 Tight interworking between NR and E-UTRA; and
 Support of Network Slicing.

The AMF 1A-07 may host the functions such as NAS signaling, NAS signaling security, AS security control, SMF selection, Authentication, Mobility management and positioning management.

The UPF 1A-08 may host the functions such as packet routing and forwarding, transport level packet marking in the uplink, QoS handling and the downlink, mobility anchoring for mobility, etc.

Figure 1B:
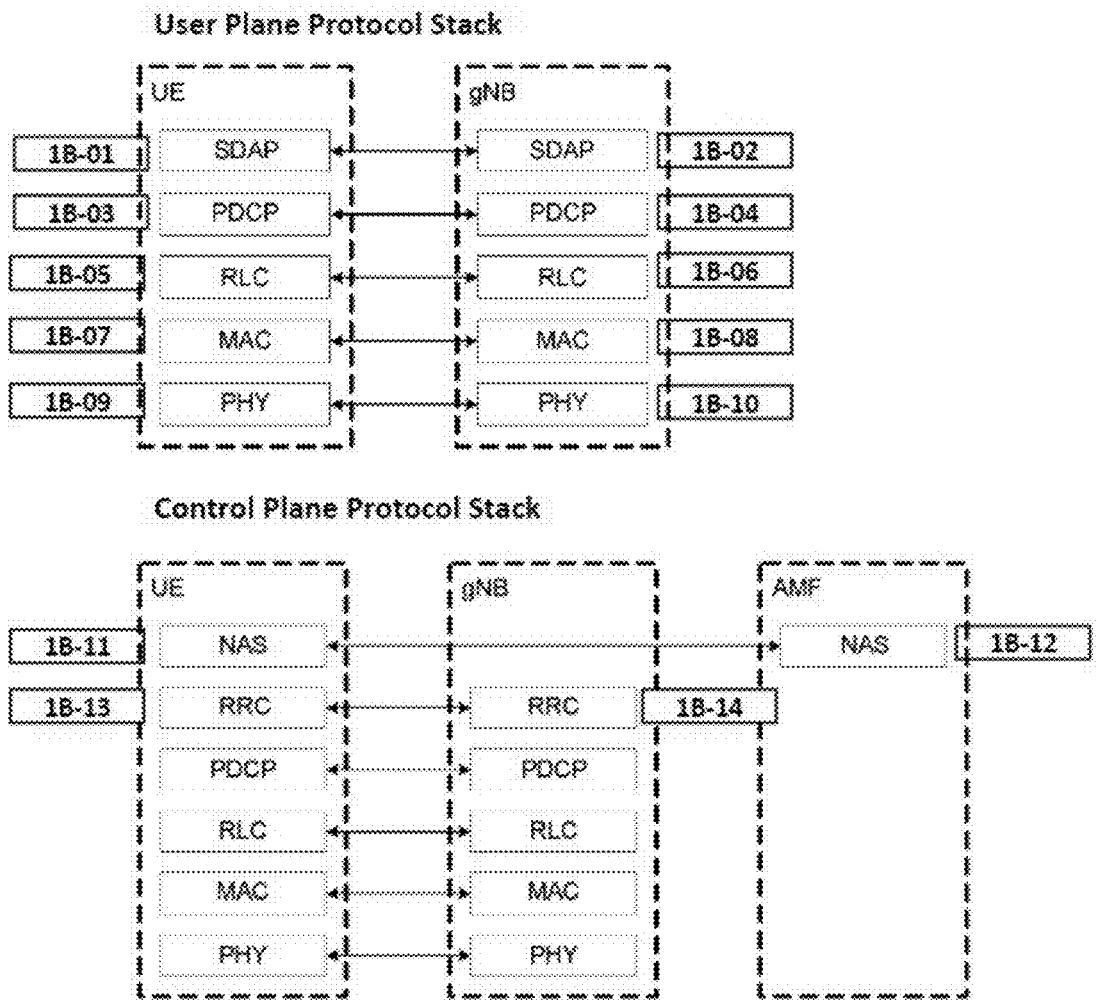
FIG. 1B is a diagram illustrating an example wireless protocol architecture in a 5G system to which the disclosure may be applied.

FIG. 1B is a diagram illustrating an example wireless protocol architecture in a wireless communication system (e.g., 2G/3G/4G systems, a 5G system, etc.) to which the disclosure may be applied.

User plane protocol stack may include SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack may include NAS 1B-11 or 1B-12. RRC 1B-13 or 1B-14, PDCP. RLC. MAC and PHY.

Each protocol sublayer may perform functions related to the operations listed in table 3.

TABLE 3

| Sublayer | Functions |
| --- | --- |
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
| --- | --- |
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection;Broadcast of system information; Cell re-selection mobility; Paging is initiated by NG-RAN (RAN paging); RAN-based notification area (RNA) is managed by NG-RAN; DRX for RAN paging configured by NG-RAN; 5GC-NG-RAN connection (both C/U-planes) is established for UE; The UE AS context is stored in NG-RAN and the UE; NG-RAN knows the RNA which the UE belongs to. |
| RRC_CONNECTED | 5GC-NG-RAN connection (both C/U-planes) is established for UE; TheUE AS context is stored in NG-RAN and the UE;NG-RAN knows the cell which the UE belongs to; Transfer of unicast data to/from the UE; Network controlled mobility including measurements. |

Figure 1C:
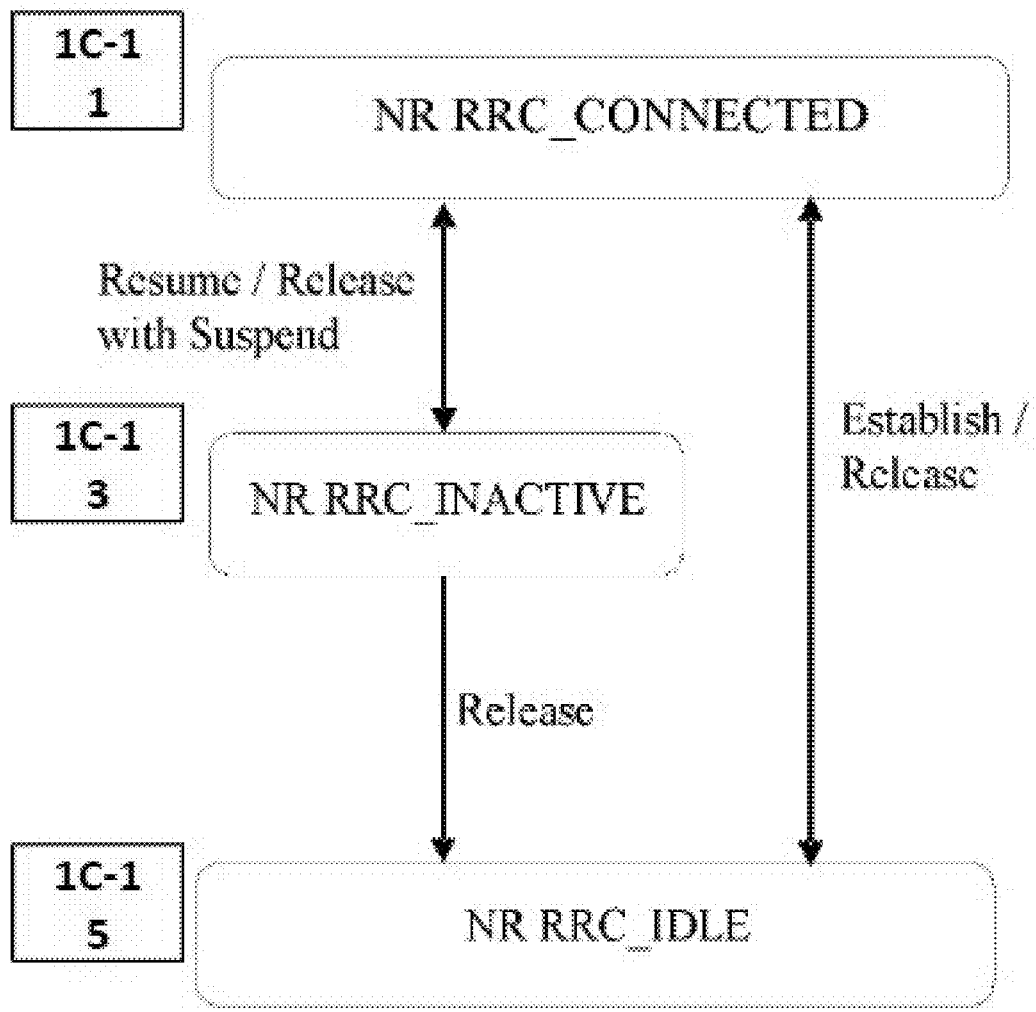
FIG. 1C is a diagram illustrating an example RRC state transition.

FIG. 1C is a diagram illustrating an example RRC state transition.

Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC_IDLE 1C-15 through RRC connection establishment and RRC connection release.

The state transition from RRC_INACTIVE to RRC_CONNECTED involves not only a signal exchange between the terminal and the base station, but also context transfer and data path change between the base stations. If the terminal has enough data to transmit, these additional procedures can be sufficiently justified, but if not, excessive overhead can reduce the efficiency of the network.

The present invention introduces a new resumption procedure capable of transmitting and receiving data without a transition to RRC_CONNECTED. Hereinafter, a resume procedure for the purpose of transitioning the terminal to the RRC_CONNECTED state from the RRC_INACTIVE state is referred to as a first resume procedure, and a procedure for transmitting data while the terminal is in the RRC_INACTIVE state is referred to as a second resume procedure, and a procedure for receiving data while the terminal is in the RRC_INACTIVE state is referred to as a third resume procedure.

Small Data Transmission (SDT) is a procedure allowing data and/or signalling transmission while remaining in a RRC_INACTIVE state (i.e. without transitioning to RRC_CONNECTED state).

SDT procedure is initiated with a transmission over either RACH (configured via system information) or Type 1 CG resources (configured via dedicated signalling in RRCRelease). The SDT resources can be configured on initial BWP for both RACH and CG. The RACH and CG resources for SDT can be configured on either or both of the NUL and SUL carriers. The CG resources for SDT are valid only within the cell UE received RRCRelease and transitioned to an RRC_INACTIVE state. For RACH, the network can configure 2-step and/or 4-step RA resources for SDT. When both the 2-step and 4-step RA resources for SDT are configured, the UE selects the RA type.

The initial PUSCH transmission during the SDT procedure includes at least the CCCH message. When using CG resources for an initial SDT transmission, the UE can perform autonomous retransmission of the initial transmission if the UE does not receive confirmation from the network (dynamic UL grant or DL assignment) before a configured timer expires. After the initial PUSCH transmission, subsequent transmissions are handled differently depending on the type of resource used to initiate the SDT procedure:

When using CG resources, the network can schedule subsequent UL transmissions using dynamic grants or they can take place on the following CG resource occasions. The DL transmissions are scheduled using dynamic assignments. The UE can initiate subsequent UL transmission only after a reception of confirmation (dynamic UL grant or DL assignment) for the initial PUSCH transmission from the network. For subsequent UL transmission, the UE cannot initiate re-transmission over a CG resource.

When using RACH resources, the network can schedule subsequent UL and DL transmissions using dynamic UL grants and DL assignments, respectively, after the completion of the RA procedure.

While the SDT procedure is ongoing, if data appears in a buffer of any radio bearer not enabled for SDT, the UE initiates a transmission of a non-SDT data arrival indication using the UEAssistanceInformation message to the network and, if available, includes the resume cause.

SDT procedure over CG resources can only be initiated with a valid UL timing alignment. The UL timing alignment is maintained by the UE based on a SDT-specific timing alignment timer configured by the network via dedicated signalling and, for initial CG-SDT transmission, also by DL RSRP of a configured number of the highest ranked SSBs which are above a configured RSRP threshold. Upon expiry of the SDT-specific timing alignment timer, the CG resources are released while maintaining the CG resource configuration.

Logical channel restrictions configured by the network while in RRC_CONNECTED state and/or in a RRCRelease message for radio bearers enabled for SDT, if any, are applied by the UE during SDT procedure.

SDT is classified as a SDT1 or SDT2.

In SDT1, the UE includes a first CCCH SDU and DCCH data or DTCH data in the MAC PDU that is transmitted to the base station the first time. In SDT1, the UE sets resumeCause field to one of the predefined first values.

In SDT2, the UE includes only a first CCCH SDU in the MAC PDU that is transmitted to the base station the first time. In SDT2, UE sets resumeCause field to a predefined second value. The predefined second value may not be equal to any of the predefined first values.

Base station determines SDT1 based on the resource where the uplink signal is transmitted the first time.

Base station determines SDT2 based on the set second value in the resumeCause field.

A RRC CONNECTION RESUME may be either to resume a suspended RRC CONNECTION or to initiate SDT. The RRC CONNECTION RESUME1 is to resume a suspended RRC connection. The RRC CONNECTION RESUME2 is to initiate SDT1. The RRC CONNECTION RESUME3 is to initiate SDT2.

RRC CONNECTION RESUME2 and SDT1 may be used interchangeably.

RRC CONNECTION RESUME3 and SDT2 may be used interchangeably.

RA-SDT1 is SDT1 where uplink data may be transmitted via Random Access procedure and dynamic grants.

CG-SDT1 is SDT1 where uplink data may be transmitted via configured type1 grants.

RA-SDT2 is SDT2 where uplink data may be transmitted via Random Access procedure and dynamic grants.

CG-SDT2 is SDT2 where uplink data may be transmitted via configured type1 grants.

CG-SDT1 and Type RRC CONNECTION RESUME2 may be used interchangeably.

RA-SDT1 and Type2 RRC CONNECTION RESUME2 may be used interchangeably.

CG-SDT2 and Type1 RRC CONNECTION RESUME3 may be used interchangeably.

RA-SDT2 and Type2 RRC CONNECTION RESUME3 may be used interchangeably.

Figure 2A:
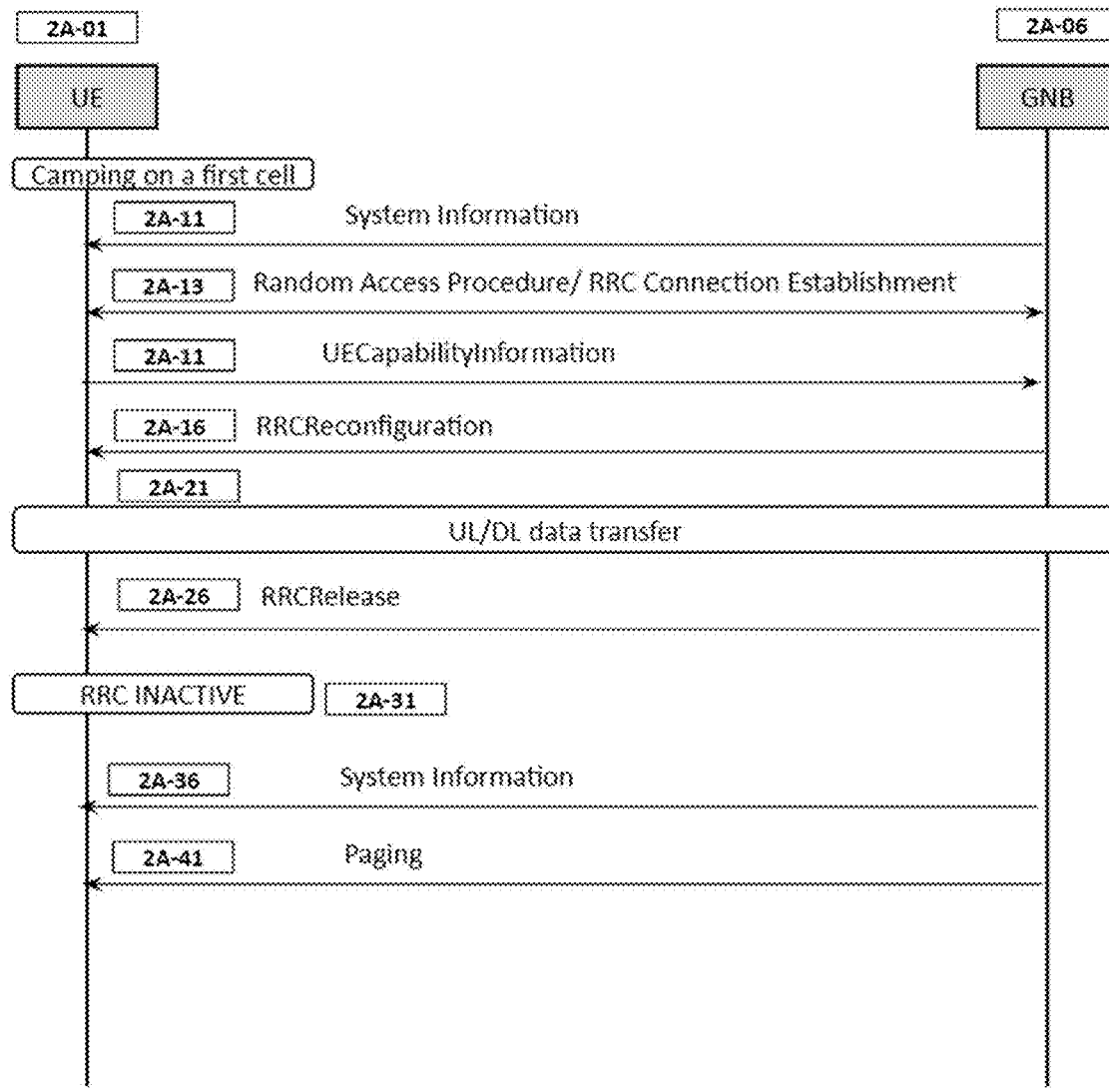
FIG. 2A is a diagram illustrating example operations of a terminal and a base station.

FIG. 2a is a diagram illustrating example operations of a terminal and a base station according to an embodiment of the present invention.

In step 2A-11, the terminal in a first cell transmits to a base station a UECapabilityInformation and transmits to an AMF a NAS message. The NAS message is either a TRACKING AREA UPDATE or an ATTACH REQUEST.

The UECapabilityInformation may include zero or one ra-SDT IE and zero or one or more cg-SDT IEs.

ra-SDT may indicate whether the UE supports transmission of data and/or signalling over allowed radio bearers in a RRC_INACTIVE state via Random Access procedure (i.e., RA-SDT). It is per UE capability. If this IE is present in the UECapabilityInformation, it means the UE supports RA-SDT in the frequency bands that the UE supports. If this IE is absent in the UECapabilityInformation, it means the UE does not support RA-SDT in the frequency bands that the UE supports.

Cg-SDT may indicate whether the UE supports transmission of data and/or signalling over allowed radio bearers in a RRC_INACTIVE state via configured grant type 1 (i.e., CG-SDT). It is per band capability. If this IE is present for a frequency band in the UECapabilityInformation, it means the UE supports CG-SDT for the frequency band. If this IE is absent for a frequency band in the UECapabilityInformation, it means the UE does not support CG-SDT for the frequency band.

The NAS message may include a UE NETWORK CAPABILITY IE. The UE NETWORK CAPABILITY IE may contain 11 octets. A specific bit of the $11^{th}$ octet may indicate whether the UE supports RRC CONNECTION RESUME3 or not. Each bit of the 11 octets may indicate whether the UE supports specific functionality.

If RA-SDT1, CG-SDT1, RA-SDT2 and CG-SDT2 are supported, the UE includes both ra-SDT IE and cg-SDT IE in the UECapabilityInformation and sets the specific bit to in the UE NETWORK CAPABILITY IE in the NAS message.

If RA-SDT1 and CG-SDT1 are supported and RA-SDT2 and CG-SDT2 are not supported, the UE includes both ra-SDT IE and cg-SDT IE in the UECapabilityInformation and sets the specific bit to 0 in the UE NETWORK CAPABILITY IE in the NAS message.

If RA-SDT1 and RA-SDT2 are supported and CG-SDT1 and CG-SDT2 are not supported, the UE includes ra-SDT IE and does not include cg-SDT IE in the UECapabilityInformation and sets the specific bit to 1 in the UE NETWORK CAPABILITY IE in the NAS message.

In 2A-16, the UE may receive from the base station a RRCReconfiguration message. The RRCReconfiguration message may include a variety of configuration information to be applied in the first cell.

In 2A-21, the UE and the base station may perform a data transfer in RRC_CONNECTED based on the configuration information in the RRCReconfiguration.

In 2A-21, the UE may receive from the base station in the first cell an RRCRelease message. The base station may transmit the RRCRelease message to either release RRC connection (and to put the UE into RRC_IDLE) or to suspend RRC connection (and to put the UE into RRC_INACTIVE). If the base station expects data activity for the UE to occur in the near future, the base station decides to suspend RRC connection. In this case, the RRCRelease message includes SuspendConfig IE and SuspendConfig includes the following fields.

<SuspendConfig>
1. The first UE identifier: an identifier of a UE that may be included in the Resume Request when a state transition to RRC_CONNECTED is made. It has a 40-bit length.
2. The second UE identifier: an identifier of a UE that may be included in the Resume Request when a state transition to RRC_CONNECTED is made. It has a 24-bit length.

3. ran-Paging Cycle: Paging cycle to be applied in RRC_INACTIVE state.
4. ran-Notification AreaInfo: Configuration information of a ran-Notification Area consisting of a list of cells and the like. UE may initiate a resume procedure when the ran_Notification Area is changed.
5. t380: Timer related to the periodic resumption procedure.
6. NextHopChangingCount (NCC): Counter used to derive new security keys after performing the resume procedure.
7. sdt-Config: Configuration information for SDT.

In 2A-31, the UE may perform the SuspendConfig operation set. The SuspendConfig operation set may be applied at a predetermined time point. For the SuspendConfig operation set, the following operations are sequentially performed.

<SuspendConfig Operation Set>
1: resetting MAC and releasing the default MAC Cell Group configuration, if any.
2: applying the received suspendConfig, except the received nextHopChainingCount and received sdt-Config.
3: determining DRB to be configured for SDT based on the sdt-DRB-List.
4: determining whether SRB2 is to be configured for SDT based on sdt-DRB2-Indication.
5: determining that SRB1 is configured for SDT based on whether sdt-Config is included in the SuspendConfig (or based on that either the sdt-DRB-List or sdt-DRB2-Indication or both are included in the sdt-Config).
6: re-establishing RLC entity of SRB2.
7: performing SDU discard for the PDCP entity of SRB1.
8: performing SDU discard for the PDCP entity of SRB2, if SRB2 is configured for SDT.
9: re-establishing RLC entity of SRB1.
10: storing in the UE Inactive AS Context the nextHopChainingCount received in the RRCRelease message, the current security keys, the EHC state, the C-RNTI used in the source PCell, PDCP configurations of radio bearers configured for SDT, RLC configurations of radio bearers configured for SDT, logical channel configurations of radio bearers configured SDT, PDCP configurations of radio bearers not configured for SDT, RLC configurations of radio bearers not configured for SDT, logical channel configurations of radio bearers not configured SDT, etc. SuspendConfig is also stored.
11: suspending all radio bearers configured for SDT.
12: suspending all radio bearers not configured for SDT.
13: entering RRC_INACTIVE and performing cell selection.

In 2A-36, the UE may select a second cell of a second base station as a consequence of the cell selection. The UE may compare the radio signal quality of the serving cell and the neighboring cell to reselect the neighboring cell having a better radio signal quality. Alternatively, a cell in which the radio signal quality is greater than or equal to a certain threshold may be selected. The first cell and the second cell can be the same or different. The first base station and the second base station can be the same or different.

The UE may receive system information including SIB1 in the second cell.

In 2A-41, the UE may monitor Paging Occasions (POs) in the second cell. The POs are determined based on the third UE identifier and PCCH-configCommon in SIB1.

The UE may receive a paging message in the paging channel of the second cell. The paging message includes a first list and a second list. The first list may include one or more entry1s and the second list may include one or more entry2s. Each entry1 may include either a first UE identifier or a third UE identifier. Entry2 is either a type1 entry2 or a type2 entry2. The type1 entry2 may consist of a first information indicating that the entry is entry2. The type2 entry2 may consist of the first information and a second information. The second information may indicate that the paging is for RRC CONNECTION RESUME3.

The number of entry2s in the second list and the number of entry Is in the first list are same. Entry2s in the second list and entry1s in the first list are listed in the same order.

If a first UE identifier included in an entry1 of the first list matches the UE's stored first UE identifier, and if the second information is included in the corresponding entry2 of the second list, the UE initiates RRC CONNECTION RESUME3 with resumeCause set to RESUME3.

If a first UE identifier included in an entry1 of the first list matches the UE's stored first identifier, and if the second information is not included in the corresponding entry2 of the second list, the UE initiates RRC CONNECTION RESUME1 with resumeCause set to mt-Access.

If a third UE identifier included in an entry1 of the first list matches UE identity allocated by upper layers, the UE performs a first set of actions.

If none of entry Is in the first list matches neither the UE's stored first identifier nor UE identity allocated by upper layers, the UE keep monitoring paging channels.

Figure 2B:
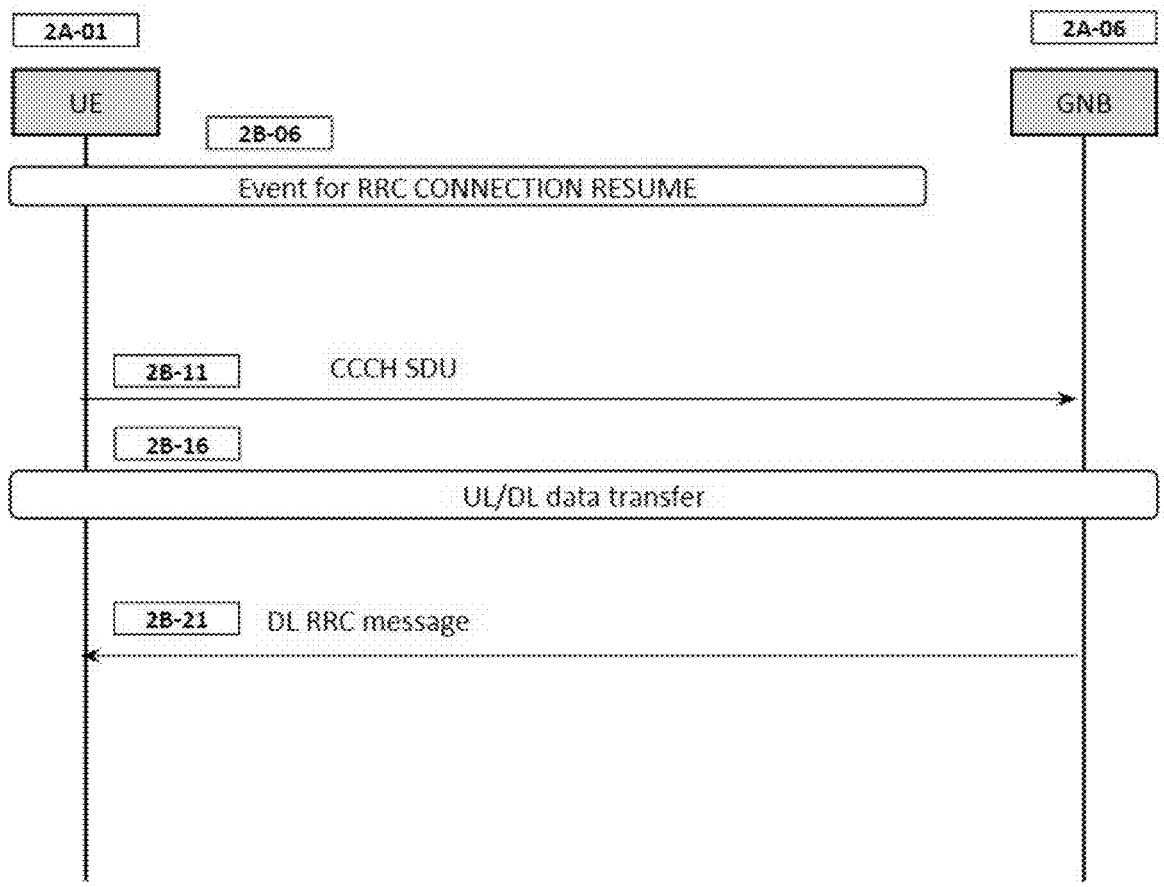
FIG. 2B is a diagram illustrating an example RRC connection resumption operation.

FIG. 2b is a diagram illustrating operations for RRC CONNECTION RESUME.

In 2B-06, an event that may trigger a RRC CONNECTION RESUME PROCEDURE occurs. When the upper layer or AS requests the resumption of the suspended RRC connection or when new data occurs or when a first paging message is received or when a second paging message is received, the RRC CONNECTION RESUME PROCEDURE may be triggered.

The first paging message may be a paging message where a first UE identifier included in an entry1 of the first list matches the UE's stored first UE identifier and the second information may be included in the corresponding entry2 of the second list.

The second paging message may be a paging message where a first UE identifier included in an entry1 of the first list matches the UE's stored first UE identifier and the second information may not be included in the corresponding entry2 of the second list.

UE may initiate a Type1 RRC CONNECTION RESUME2 when all the following conditions are fulfilled.
1: the upper layers request resumption of RRC connection and
2: SIB1 includes sdt-ConfigCommon and
3: sdt-Config is configured and
4: all the pending data in UL is mapped to the radio bearers configured for SDT and
5: the data volume of the pending UL data across all RBs configured for SDT is less than or equal to sdt-DataVolumeThreshold and
6: the RSRP of the downlink pathloss reference is higher than sdt-RSRP-Threshold.
7: CG-SDT is configured on the selected UL carrier, and TA of the configured grant Type 1 resource is valid and
8: at least one SSB configured for CG-SDT with SS-RSRP above cg-SDT-RSRP-ThresholdSSB is available.

UE determines to initiate a Type2 RRC CONNECTION RESUME2 when all the following conditions are fulfilled.

1: the upper layers request resumption of RRC connection and
2: SIB1 includes sdt-ConfigCommon and
3: sdt-Config is configured and
4: all the pending data in UL is mapped to the radio bearers configured for SDT and
5: the data volume of the pending UL data across all RBs configured for SDT is less than or equal to sdt-DataVolumeThreshold and
6: the RSRP of the downlink pathloss reference is higher than sdt-RSRP-Threshold.
7: CG-SDT is not configured on the selected UL carrier, or TA of the configured grant Type 1 resource is not valid or none of SSB configured for CG-SDT with SS-RSRP above cg-SDT-RSRP-ThresholdSSB is available (or Type2 RRC CONNECTION RESUME2 is not initiated).
8: at least one set of the Random Access resources for Type2 RRC CONNECTION RESUME2s are available in the selected uplink carrier.

The UE may determine to initiate a Type1 RRC CONNECTION RESUME3 when all the following conditions are fulfilled.
1: a first paging message is received
2: SIB1 includes sdt-ConfigCommon and
3: sdt-Config is configured and
4: all the pending data in UL is mapped to the radio bearers configured for SDT and
5: the data volume of the pending UL data across all RBs configured for SDT is less than or equal to sdt-Data Volume Threshold and
6: the RSRP of the downlink pathloss reference is higher than sdt-RSRP-Threshold.
7: the downlink channel quality of the cell is higher than sdt-CQI-Threshold
8: CG-SDT is configured on the selected UL carrier, and TA of the configured grant Type 1 resource is valid Alternatively, the UE may initiate a Type2 RRC CONNECTION RESUME2 when all the following conditions are fulfilled.
1: a first paging message is received;
2: the downlink channel quality of the cell is higher than sdt-CQI-Threshold;
3: CG-SDT is configured on the selected UL carrier, and TA of the configured grant Type 1 resource is valid;

UE may determine to initiate a Type2 RRC CONNECTION RESUME3 when all the following conditions are fulfilled.
1: a first paging message is received;
2: SIB1 includes sdt-ConfigCommon; and
3: sdt-Config is configured; and
4: all the pending data in UL is mapped to the radio bearers configured for SDT; and
5: the data volume of the pending UL data across all RBs configured for SDT is less than or equal to sdt-DataVolumeThreshold; and
6: the RSRP of the downlink pathloss reference is higher than sdt-RSRP-Threshold;
7: the downlink channel quality of the cell is higher than sdt-CQI-Threshold;
8. CG-SDT is not configured on the selected UL carrier, or the TA of the configured grant Type 1 resource is not valid or none of SSB configured for CG-SDT with SS-RSRP above cg-SDT-RSRP-ThresholdSSB is available (or Type1 RRC CONNECTION RESUME3 is not initiated).

Alternatively, the UE may initiate the Type2 RRC CONNECTION RESUME3 when all the following conditions are fulfilled.
1: a first paging message is received;
2: the downlink channel quality of the cell is higher than sdt-CQI-Threshold.

Alternatively, the UE may initiate the Type2 RRC CONNECTION RESUME3 regardless of whether CG-SDT is configured or not (i.e., for RRC CONNECTION RESUME3, only RA-SDT is applied).

RRC CONNECTION RESUME2 is the procedure for the UE to transmit uplink data without transitioning to RRC_CONNECTED. That is the reason why the uplink data volume and uplink channel quality are tested before initiating the RRC CONNECTION RESUME2.

RRC CONNECTION RESUME3 is the procedure for the UE to receive downlink data without transitioning to RRC_CONNECTED. That is the reason why the downlink channel quality is tested before initiating the RRC CONNECTION RESUME3.

The UE may determine to initiate a RRC CONNECTION RESUME1 when one of following conditions are fulfilled.
1: a second paging message is received;
2: RNA update is triggered as a consequence of the expiry of T380;
3: RNA update is triggered as a consequence of change of RNA.

A UE in RRC_INACTIVE may initiate a RRC CONNECTION RESUME2 when both the upper layer condition set for initiating RRC CONNECTION RESUME2 and the lower layer condition set for initiating RRC CONNECTION RESUME2 are fulfilled.

The upper layer condition set for initiating RRC CONNECTION RESUME2 may be fulfilled when all the conditions below are fulfilled.
1: the upper layers request resumption of RRC connection; and
2: SIB1 includes sdt-ConfigCommon; and
3: sdt-Config is configured; and
4: all the pending data in UL (stored in PDCP) is mapped to the radio bearers configured for SDT.

The lower layer condition set for initiating RRC CONNECTION RESUME2 may be fulfilled in the CASE and CASE2 and CASE3 and CASE4.
<Case 1>
1: The data volume of the pending UL data across all RBs configured for SDT is less than or equal to sdt-DataVolumeThreshold; and
2: The RSRP of the downlink pathloss reference is higher than the sdt-RSRP-Threshold; and
3: CG-SDT is configured on the selected UL carrier, and the TA of the configured grant Type 1 resource is valid; and
4: At least one SSB configured for CG-SDT with SS-RSRP above the cg-SDT-RSRP-ThresholdSSB is available.
<Case 2>
1: The data volume of the pending UL data across all RBs configured for SDT is less than or equal to the sdt-DataVolumeThreshold; and
2: the sdt-RSRP-Threshold is not configured; and
3: CG-SDT is configured on the selected UL carrier, and the TA of the configured grant Type 1 resource is valid; and
4: At least one SSB configured for CG-SDT with SS-RSRP above the cg-SDT-RSRP-ThresholdSSB is available.

<Case 3>
1: The data volume of the pending UL data across all RBs configured for SDT is less than or equal to the sdt-DataVolumeThreshold; and
2: The RSRP of the downlink pathloss reference is higher than the sdt-RSRP-Threshold; and
3: CG-SDT is not configured on the selected UL carrier, or the TA of the configured grant Type 1 resource is not valid; and
4: a set of Random Access resources for performing RA-SDT are selected on the selected UL carrier.

<Case 4>
1: The data volume of the pending UL data across all RBs configured for SDT is less than or equal to the sdt-DataVolumeThreshold; and
2: sdt-RSRP-Threshold; is not configured; and
3: CG-SDT is not configured on the selected UL carrier, or the TA of the configure d grant Type 1 resource is not valid; and
4: a set of Random Access resources for performing RA-SDT are selected on the selected UL carrier.

The TA of the configured grant Type1 resource may be valid in the following case.
1: The RSRP values for the stored downlink pathloss reference and the current downlink pathloss reference are valid; and
2: Compared to the stored downlink pathloss reference RSRP value, the current RSRP value of the downlink pathloss reference has not increased/decreased by more than the cg-SDT-RSRP-ChangeThreshold, if configured; and
3: cg-SDT-TimeAlignmentTimer is running.

The UE, upon the reception of CG-SDT configuration, may store the RSRP of the downlink pathloss reference for the Serving Cell.

The UE, upon the reception of RRCRelease including sdt-MAC-PHY-CG-Config, may start the cg-SDT-TimeAlignmentTimer.

A UE in RRC_INACTIVE initiates a RRC CONNECTION RESUME3 if the upper layer condition set for initiating RRC CONNECTION RESUME3 is fulfilled.

The upper layer condition set for initiating RRC CONNECTION RESUME3 is fulfilled if all the conditions below are fulfilled.
1: The first paging message is received; and
2: SIB1, received in the cell where the first paging message is received, includes sdt-ConfigCommon; and
3: sdt-Config is configured (i.e., RRCRelease message includes sdt-Config);
4: no pending data in UL except CCCH SDU.

In 2B-11, the UE may transmit a first CCCH SDU to the base station.

The first CCCH SDU may be a RRCResumeRequest in the following cases.
1: The RRC CONNECTION RESUME1 is initiated;
2: The type1 RRC CONNECTION RESUME2 is initiated;
3: The type2 RRC CONNECTION RESUME2 is initiated.

The RRCResumeRequest includes the following fields and IEs.

TABLE 5

| Field | IE | Description |
| --- | --- | --- |
| resumeIdentity | I-RNTI-Value | First UE identifier provided in RRCRelease |
| resumeMAC-I | 16 bit BIT STRING | Authentication token to facilitate UE authentication |
| resumeCause | ResumeCause | Can indicate one of first predefined values. The first predefined values are emergency, mt-Access, mo-Signalling, mo-Data, etc. |

The first CCCH SDU is a RRCResumeRequest2 in the following cases.
1: The type1 RRC CONNECTION RESUME3 is initiated;
2: The type2 RRC CONNECTION RESUME3 is initiated.

The RRCResumeRequest2 includes the following fields and IEs.

TABLE 6

| Field | IE | Description |
| --- | --- | --- |
| resumeIdentity | ShortI-RNTI-Value | Second UE identifier provided in RRCRelease |
| resumeMAC-I | 16 bit BIT STRING | Authentication token to facilitate UE authentication |
| resumeCause | ResumeCause | Indicating a second predefined value. The second predefined value is RRC CONNECTION RESUME3. |
| ChannelQualityIndicator | 4 bit BIT STRING | downlink channel quality indicator of the initial BWP of the cell where random access procedure is being performed (or where CCCH SDU is being transmitted) Each of 16 code points corresponds to a predefined combination of modulation and code rate and transport block size |
| MeasQuantityResults | RSRP-Range | RSRP of the serving cell derived based on a specific SS/PBCH block of the cell where random access procedure is being performed (or where CCCH SDU is being transmitted). The SS/PBCH block selected for random access preamble transmission is the specific SS/PBCH block. |

To transmit the first CCCH SDU, random access procedure is performed in the following cases.
1: The RRC CONNECTION RESUME1 is initiated;
2: The type2 RRC CONNECTION RESUME2 is initiated;
3: The type2 RRC CONNECTION RESUME3 is initiated.

To transmit the first CCCH SDU, the configured grant/resource is used in the following cases.
1: The type1 RRC CONNECTION RESUME2 is initiated;
2: The type1 RRC CONNECTION RESUME3 is initiated.

In 2B-16, the UE may perform data transfer with the base station after the first CCCH SDU transmission. In the RRC CONNECTION RESUME2, the uplink data transfer may be performed. In the RRC CONNECTION RESUME3, the downlink data transfer may be performed.

A first C-RNTI may be used for data transfer in the type2 RRC CONNECTION RESUME2 and in type2 the RRC CONNECTION RESUME3.

A first CS-RNTI may be used for data transfer in the type1 RRC CONNECTION RESUME2 and in the type1 RRC CONNECTION RESUME3.

The first C-RNTI may be received in Random Access Response.

The first CS-RNTI may be received in RRCRelease.

In 2B-21, the UE may receive a first DL RRC message to terminate the RRC CONNECTION RESUME PROCEDURE. The first DL RRC message may be RRCSetUp in the RRC CONNECTION RESUME1. The first DL RRC message may be RRCRelease in the RRC CONNECTION RESUME2. The first DL RRC message may be RRCRelease in the RRC CONNECTION RESUME3.

In the following, Random Access procedure is explained.

When a Random Access procedure is initiated for RRC CONNECTION RESUME (i.e. a RRC CONNECTION RESUME1 or a type2 RRC CONNECTION RESUME2 a type2 RRC CONNECTION RESUME3) in a cell, the UE may select an uplink based on information included in SIB1 of the cell.

If the Serving Cell for the Random Access procedure is configured with supplementary uplink and if the RSRP of the downlink pathloss reference is less than rsrp-ThresholdSSB-SUL, the UE selects the SUL carrier for performing Random Access procedure.

If the Serving Cell for the Random Access procedure is not configured with supplementary uplink or if the RSRP of the downlink pathloss reference is equal to or greater than rsrp-ThresholdSSB-SUL, the UE selects the NUL carrier for performing Random Access procedure.

The UE may select a set of Random Access resources applicable to the current Random Access procedure based on one or more RACH-ConfigCommon IEs in SIB1 of the cell and features applicable for the Random Access procedure.

If one or more features including RedCap and/or a specific NSAG(s) and/or RESUME2 and/or MSG3 repetition is applicable for this Random Access procedure, and if none of the sets of Random Access resources are available for any feature applicable to the current Random Access procedure, the UE selects the set(s) of Random Access resources that are not associated with any feature indication for this Random Access procedure.

If one or more of the features including RedCap and/or a specific NSAG(s) and/or RESUME2 and/or MSG3 repetition is applicable for this Random Access procedure, and if there is one set of Random Access resources available which can be used for all features triggering this Random Access procedure, the UE selects this set of Random Access resources for this Random Access procedure.

If no feature is applicable for this Random Access procedure, the UE selects the set of Random Access resources that are not associated with any feature indication for the current Random Access procedure.

If the UE is a RedCap UE, the RedCap feature is applicable for the current Random Access procedure. A RedCap UE has reduced capabilities with the intention to have lower complexity with respect to non-RedCap UEs. It is mandatory for a RedCap UE to support 20 MHz maximum UE channel bandwidth in FR1 and 100 MHz in FR2.

If the BWP for Random Access procedure is configured with the set(s) of Random Access resources with MSG3 repetition indication, the MSG3 repetition feature is applicable for the current Random Access procedure.

If the Random Access procedure is initiated for a RRC CONNECTION RESUME2, RESUME2 is applicable for the current Random Access procedure.

The UE may perform a Random Access procedure based on the set of Random Access resources selected for the current Random Access procedure and based on the parameter set1 associated with the set of Random Access resources and based on the parameter set2 associated with the set of Random Access resources.

A set of Random Access resources may be associated with (or correspond to) a FeatureCombinationPreambles IE.

A parameter set1 may be associated with one or more FeatureCombinationPreambles IEs. A parameter set1 may be commonly applied to the one or more sets of Random Access resources. The one or more sets of Random Access resources is associated with the one or more FeatureCombinationPreambles IEs.

A parameter set1 associated with a set of Random Access resources is included in the non-extended part of a RACH-ConfigCommon that includes the associated one or more FeatureCombinationPreambles IEs.

A parameter set2 may be associated with a FeatureCombinationPreambles IE. A parameter set2 may be included in the associated FeatureCombinationPreambles IE. A parameter set2 may be applied to a set of Random Access resources associated with the FeatureCombinationPreambles IE.

FeatureCombinationPreamble IE may be included in the extended part of a RACH-ConfigCommon.

Parameter set1 may include fields such as prach-ConfigurationIndex, msg1-FrequencyStart, preambleReceivedTargetPower, ra-ResponseWindow, preambleTransMax, msg1-SubcarrierSpacing, rsrp-ThresholdSSB, rsrp-ThresholdSSB-SUL, and ra-ContentionResolutionTimer.

Parameter set2 may include fields such as messagePowerOffsetGroupB, rsrp-ThresholdSSB, ra-SizeGroupA and deltaPreamble.

The UE may select a SSB based on a rsrp-ThresholdSSB in the parameter set2 associated with the set of Random Access resources selected for this Random Access procedure.

The UE may select a SSB not based on a rsrp-ThresholdSSB in the parameter set1 associated with the set of Random Access resources selected for this Random Access procedure.

The UE may select preamble group based on ra-Msg3SizeGroupA and messagePowerOffsetGroupB and numberOfRA-PreamblesGroupA in the FeatureCombinationPreambles IE associated with the set of Random Access resources selected for the current Random Access procedure.

64 preambles are defined in total. They can be divided into two groups. The UE having large data and being in a good channel condition can select Preamble Group B so that GNB can allocate bigger UL grant. The UE having smaller data or being in a bad channel condition can select Preamble Group A so that GNB can allocate normal UL grant.

If the potential Msg3 size (UL data available for transmission plus MAC subheader(s) and, where required, MAC CEs) is greater than ra-Msg3SizeGroupA (or ra-SizeGroupA) and the pathloss is less than PCMAX (of the Serving Cell performing the Random Access Procedure)-preambleReceivedTargetPower-msg3-DeltaPreamble or deltaPreamble-messagePowerOffsetGroupB, the UE selects the Random Access Preamble group B.

If the Random Access procedure was initiated for the CCCH logical channel and the CCCH SDU size plus MAC subheader is greater than ra-Msg3SizeGroupA (or ra-SizeGroupA), the UE selects the Random Access Preamble group B.

If the Random Access procedure was not initiated for the CCCH logical channel, and if the potential Msg3 size (UL data available for transmission plus MAC subheader(s) and, where required, MAC CEs) is not greater than ra-Msg3SizeGroupA (or ra-SizeGroupA), the UE selects the Random Access Preamble group A.

If the Random Access procedure was initiated for the CCCH logical channel, and if the potential Msg3 size (UL data available for transmission plus MAC subheader(s) and, where required, MAC CEs) is not greater than ra-Msg3SizeGroupA (or ra-SizeGroupA), the UE selects the Random Access Preamble group A.

If the Random Access procedure was not initiated for the CCCH logical channel, and if the potential Msg3 size (UL data available for transmission plus MAC subheader(s) and, where required, MAC CEs) is greater than ra-Msg3SizeGroupA (or ra-SizeGroupA), and the pathloss is not less than PCMAX (of the Serving Cell performing the Random Access Procedure)-preambleReceivedTargetPower-msg3-DeltaPreamble or deltaPreamble-messagePowerOffsetGroupB, the UE selects the Random Access Preamble group A.

The preambleReceivedTargetPower in parameter set1 associated with the set of Random Access resources selected for this Random Access procedure is used.

The messagePowerOffsetGroupB in parameter set2 associated with the set of Random Access resources selected for this Random Access procedure is used.

If deltaPreamble is included in parameter set2 associated with the set of Random Access resources selected for this Random Access procedure, the deltaPreamble is used.

If deltaPreamble is not included in parameter set2 associated with the set of Random Access resources selected for this Random Access procedure, the msg3-DeltaPreamble included in the PUSCH-ConfigCommon of the uplink initial BWP is used.

If parameter set2 (or FeatureCombinationPreambles IE) associated with the set of Random Access resources selected for this Random Access procedure is present, a ra-SizeGroupA in the parameter set2 is used.

If parameter set2 (or FeatureCombinationPreambles IE) associated with the set of Random Access resources selected for this Random Access procedure is absent, a ra-Msg3SizeGroupA in the parameter set1 is used.

If no feature is applicable for this Random Access procedure, the parameter set2 (or FeatureCombinationPreambles IE) associated with the set of Random Access resources selected for this Random Access procedure is absent.

The UE may select a preamble randomly with equal probability from the preambles associated with the selected SSB from the selected preamble group. The UE may set the PREAMBLE_INDEX to a ra-PreambleIndex corresponding to the selected preamble.

The UE may determine the next available PRACH occasion from the PRACH occasions corresponding to the selected SSB. The UE shall select a PRACH occasion randomly with equal probability amongst the consecutive PRACH occasions indicated by the PRACH configuration index in parameter set1 associated with the set of Random Access resources selected for this Random Access procedure.

The UE may transmit the selected preamble in the selected PRACH occasion in the selected uplink.

The UE may set PREAMBLE_RECEIVED_TARGET_POWER to preambleReceivedTargetPower+DELTA_PREAMBLE+(PREAMBLE_POWER_RAMPING_COUNTER−1)×powerRampingStep+POWER_OFFSET_2STEP_RA.

The UE may set the transmission power of the preamble to the sum of PREAMBLE_RECEIVED_TARGET_POWER and the pathloss of DL pathloss reference.

preambleReceivedTargetPower in parameter set1 associated with the set of Random Access resources selected for this Random Access procedure is used.

The UE may set DELTA_PREAMBLE according to the preamble format determined from the prach-ConfigurationIndex indicated in parameter set1 associated with the set of Random Access resources selected for this Random Access procedure. DELTA_PREAMBLE is predefined for each preamble format. PREAMBLE_POWER_RAMPING_COUNTER is initialized to 1 and increases by 1 for each preamble transmission.

The UE may receive RAR including an uplink grant.

To receive RAR, the UE may start the ra-ResponseWindow configured by RACH-ConfigCommon at the first PDCCH occasion from the end of the Random Access Preamble transmission. The UE may monitor the PDCCH of the SpCell for Random Access Response(s) identified by the RA-RNTI while the ra-ResponseWindow is running.

ra-ResponseWindow in parameter set1 associated with the set of Random Access resources selected for this Random Access procedure is used.

The UE may consider Random Access Response reception successful if the Random Access Response contains a MAC subPDU with Random Access Preamble identifier corresponding to the transmitted PREAMBLE_INDEX.

The MAC subPDU may contain a MAC RAR. The MAC RAR may include fields like Timing Advance Command, Uplink Grant and Temporary C-RNTI. The Timing Advance Command field may indicate the index value used to control the amount of timing adjustment that the UE has to apply. The size of the Timing Advance Command field is 12 bits. The UE may adjust the uplink transmission timing based on the Timing Advance Command field and start the timeAlignmentTimer. The timeAlignmentTimer is set to timeAlignmentTimerCommon, and the same timeAlignmentTimerCommon may be applied to all feature combinations of an uplink. The Uplink Grant field indicates the resources to be used on the uplink. The size of the UL Grant field is 27 bits. The Temporary C-RNTI field indicates the temporary identity that is used by the UE during Random Access. The size of the Temporary C-RNTI field is 16 bits.

Uplink Grant field further includes the PUSCH time resource allocation field. PUSCH time resource allocation field is 4 bits.

The UE may perform a Msg3 transmission at the determined slot according to the UL grant in the received RAR.

The UE may determine the PUSCH transmission power by summing offset, pathloss and other parameters related with number of PRBs and power control commands.

The offset is sum of preambleReceivedTargetPower and msg3-DeltaPreamble or deltaPreamble.

preambleReceivedTargetPower in parameter set1 associated with the set of Random Access resources selected for this Random Access procedure is used.

If deltaPreamble is included in parameter set2 associated with the set of Random Access resources selected for this Random Access procedure, the deltaPreamble is used.

If deltaPreamble is not included in parameter set2 associated with the set of Random Access resources selected for this Random Access procedure, the msg3-DeltaPreamble included in the PUSCH-ConfigCommon of the uplink initial BWP is used.

The UE may generate a Msg3. If a RRC CONNECTION RESUME2 is applied, the Msg3 (or the MAC PDU scheduled by RAR) includes a RRC message and a DRB data. The RRC message is not ciphered and the DRB data is ciphered by the security key stored in the UE AS context. The RRC message is included in the first MAC SDU and the DRB data is included in the second MAC SDU. The first MAC SDU and the second MAC SDU consists of a MAC subheader and MAC payload. The MAC payload of the second MAC SDU contains the DRB data. The MAC subheader is not ciphered. The second MAC SDU is located after the first MAC SDU.

The UE may transmit the Msg3. The UE starts a contention-ResolutionTimer. The timer is set by the value indicated in the selected RACH-ConfigCommon of the selected uplink carrier.

If a RRC CONNECTION RESUME3 is applied, the Msg3 includes a RRC message. The RRC message is not ciphered.

GNB receives the Msg3 and processes the RRC message included in Msg 3. If RRC message requests connection setup, the GNB performs call admission control and acts up on the result.

The UE receives Msg 4 from the base station. Msg 4 includes a MAC CE. If the UE Contention Resolution Identity in the MAC CE matches the CCCH SDU transmitted in Msg3, the UE considers this Contention Resolution successful.

In the following, various messages and IEs are explained.

The UE may receive SIB1 in a suitable cell. GNB includes various information in the SIB1. The SIB1 contains information relevant when evaluating if a UE is allowed to access a cell and defines the scheduling of other system information. It also contains radio resource configuration information that is common for all UEs. It also contains radio resource configuration information that is common for feature combinations.

SIB1 may include a ServingCellConfigCommonSIB IE. The ServingCellConfigCommonSIB IE may include a downlinkConfigCommon field, a uplinkConfigCommon field, a supplementaryUplink field, and a uplinkConfigCommon-v1700 field. The downlinkConfigCommon field may include a DownlinkConfigCommonSIB IE. The uplinkConfigCommon field may include a UplinkConfigCommonSIB IE. The supplementaryUplink field may include a UplinkConfigCommonSIB. The uplinkConfigCommon-v1700 field may include a UplinkConfigCommon-v1700 IE.

The DownlinkConfigCommonSIB may provide common downlink parameters of a cell. The DownlinkConfigCommonSIB IE may include an initialDownlinkBWP field and a bcch-Config field and a pcch-Config field and an initialDownlinkBWP-RedCap field.

The initialDownlinkBWP field may include a BWP-DownlinkCommon IE. It may provide the initial downlink BWP configuration for a PCell.

The bcch-Config field may include a BCCH-Config IE.
The pcch-Config field may include a PCCH-Config IE.
The initialDownlinkBWP-RedCap-r17 field may include a BWP-DownlinkCommon IE. It may provide the initial downlink BWP configuration for a PCell for the RedCap UEs.

The PCCH-Config IE is configuration related to paging. It includes fields such as the base station paging period, PF-related parameters, and PO-related parameters.

The BCCH-Config IE is a configuration related to system information. It includes fields such as modificationPeriodCoeff, indicating the length of the modification period.

BWP-DownlinkCommon IE is the configuration of a downlink BWP. It includes fields such as a BWP IE and a PDCCH-ConfigCommon IE, and a PDSCH-ConfigCommon IE.

PDCCH-ConfigCommon IE is the cell-specific PDCCH parameters of the BWP. It includes fields such as controlResourceSetZero, commonControlResourceSet, searchSpaceZero, commonSearchSpaceList, searchSpaceOtherSystemInformation, pagingSearchSpace, and ra-SearchSpace.

controlResourceSetZero includes an integer between 0 and 15. It may indicate one of the predefined CORESET #0 configurations.

searchSpaceZero includes an integer between 0 and 15. It may indicate one of the predefined SS #0 configurations.

commonControlResourceSet is a common CORESET defined by ControlResourceSet IE. It defines an additional CORESET that can be used for paging reception, random access response reception, system information reception, etc.

commonSearchSpaceList is a list of common SSs. The common SS may be used for paging reception, random access response reception, system information reception, and the like.

searchSpaceOtherSystemInformation includes the SS identifier IE.

pagingSearchSpace includes the SS identifier IE.
ra-SearchSpace includes the SS identifier IE.
PDSCH-ConfigCommon IE is cell-specific PDSCH parameters of this BWP. It consists of a pdsch-TimeDomainAllocationList. The pdsch-TimeDomainAllocationList includes one or more pdsch-TimeDomainAllocations.

pdsch-TimeDomainAllocation is a time domain relationship between the PDCCH and the PDSCH. It includes fields such as K0 and startSymbolAndLength. K0 is the slot offset between the DCI and the scheduled PDSCH. startSymbolAndLength is an index indicating a valid start symbol and length combination.

The UplinkConfigCommonSIB IE in the uplinkConfigCommon field provides the common uplink parameters of a cell for normal uplink.

The UplinkConfigCommonSIB IE in the supplementaryUplink field provides the common uplink parameters of a cell for supplementary uplink.

The UplinkConfigCommon-v1700 IE provides common uplink parameters of a cell for the RedCap Ues.

UplinkConfigCommonSIB IE is a common uplink configuration of the serving cell. It includes fields such as frequencyInfoUL, initialUplinkBWP, and timeAlignmentTimer Common.

The UplinkConfigCommon-v1700 IE is a common uplink configuration of the serving cell for RedCap Ues. It includes the initialUplinkBWP-RedCap field.

FrequencyInfoUL-SIB IE in the frequencyInfoUL field is a basic parameter of the uplink carrier. It includes fields such as a frequency band list and carrier bandwidth for each SCS.

BWP-UplinkCommon IE in the initialUplinkBWP field and in the initialUplinkBWP-RedCap field is the configuration of the uplink initial BWP. It includes IEs such as a BWP, a RACH-ConfigCommon (in a rach-ConfigCommon field), PUSCH-ConfigCommon, PUCCH-ConfigCommon, and a AdditionalRACH-ConfigList (in a additionalRACH-ConfigList field).

timeAlignmentTimerCommon is a timer applied when the UE performs random access for RRC connection establishment procedure and RRC connection re-establishment procedure. When the UE receives the RAR, it starts driving the timer, and stops driving the timer when contention fails.

The AdditionalRACH-ConfigList IE includes a list of feature or feature-combination-specific RACH configurations. It includes one or more RACH-ConfigCommon IEs.

RACH-ConfigCommon IE (in the rach-ConfigCommon field or in the additionalRACH-ConfigList field) is the cell-specific random access parameter of the BWP. It includes fields such as prach-ConfigurationIndex, msg1-FrequencyStart, preambleReceivedTarget Power, ra-ResponseWindow, preambleTransMax, msg1-SubcarrierSpacing, rsrp-ThresholdSSB, rsrp-ThresholdSSB-SUL and ra-ContentionResolutionTimer and optionally featureCombinationPreamblesList.

prach-ConfigurationIndex is a PRACH configuration index. One PRACH configuration corresponds to pattern information on a PRACH transmission opportunity in the time domain (information indicating in which symbol in which slot of which radio frame PRACH transmission is possible), a transmission format of a preamble, and the like.

msg1-FrequencyStart is the offset from PRB0 of the lowest PRACH transmission opportunity. It is information indicating a PRACH transmission resource in the frequency do main. PRB0 is the lowest frequency PRB among PRBs of the corresponding carrier.

preambleReceivedTargetPower is the target power level of the network receiving end. It is a parameter related to transmission power control during the random access procedure.

ra-ResponseWindow is the length of the random access response window expressed in the number of slots.

preamble TransMax is the maximum number of random access preamble transmissions.

msg1-SubcarrierSpacing is PRACH's SCS. It is commonly applied to general terminals and the RedCap UEs.

rsrp-ThresholdSSB is the SSB selection criteria. The UE performs random access by selecting a preamble corresponding to the selected SSB.

rsrp-ThresholdSSB_SUL is the SUL selection criteria. The UE selects SUL carrier for random access procedure based at least in part on this threshold.

ra-ContentionResolutionTimer is the initial value of the contention resolution timer. It indicates the number of subframes.

featureCombinationPreambleList field includes one or more FeatureCombinationPreambles IEs.

A FeatureCombinationPreambles IE is associated with a set of Random Access resources.

A FeatureCombinationPreambles IE includes the following fields and IEs.

TABLE 7

| Field name | IE | Description |
| --- | --- | --- |
| featureCombination | FeatureCombination | This field indicates which combination of features that the preambles indicated by this IE are associated with. |
| startPreambleForThisPartition | INTEGER (1 . . . 64) | It defines the first preamble associated with the Feature Combination. |

TABLE 7-continued

| Field name | IE | Description |
| --- | --- | --- |
| numberOfPreamblesForThisPartition | NTEGER (1 . . . 64) | It determines how many consecutive preambles are associated to the Feature Combination |
| ra-SizeGroupA | ENUMERATED {b56, b144, b208, b256, b282, b480, b640, b800, b1000, b72, spare6, spare5, spare4, spare3, spare2, spare1} | Transport Blocks size threshold in bits below which the UE shall use a contention-based RA preamble of group A. |
| messagePowerOffsetGroupB | ENUMERATED {minusinfinity, dB0, dB5, dB8, dB10, dB12, dB15, dB18} | Threshold for preamble selection. Value is in dB. Value minusinfinity corresponds to −infinity |
| numberOfRA-PreamblesGroupA | INTEGER (1 . . . 64) | It determines how many consecutive preambles per SSB are associated to Group A |
| rsrp-ThresholdSSB | RSRP-Range | L1-RSRP threshold used for determining whether a candidate beam may be used by the UE |
| deltaPreamble | INTEGER (−1 . . . 6) | Power offset between msg3 and RACH preamble transmission |

The FeatureCombination IE indicates a feature or a combination of features to be associated with a set of Random Access resources.

A featureCombination indicates the feature combinations for which this RACH configuration applies. The featureCombination IE includes a redCap field and RESUME2 field and covEnh field and slicing field. The redCap field and Resume2 field and covEnh field is 1 bit enumerated with a single value of "true". If the corresponding field is present, it indicates that the redCap or RESUME2 or Coverage Enhancement is one of the features of this feature combination.

Upon receiving the information, the UE applies the timeAlignmentTimerCommon received from SIB1 to the timeAlignmentTimer before starting transmission of a specific uplink RRC message.

The specific uplink RRC message could be RRCSetupRequest, RRCReestablishmentRequest or RRCResumeRequest. The UE in RRC_IDLE transmits an RRCSetupRequest message to establish an RRC connection. The UE in RRC_INACTIVE transmits an RRCResumeRequest message to resume the RRC connection. The UE in RRC_CONNECTED transmits an RRCReestablishmentRequest message to re-establish an RRC connection.

When the uplink RRC message transmission is initiated, a random access procedure is initiated.

There are two types of transmission without dynamic grant:
- Configured grant Type 1 where an uplink grant is provided by RRC, and stored as configured uplink grant;
- Configured grant Type 2 where an uplink grant is provided by PDCCH and stored or cleared as configured uplink grant based on LI signalling indicating the configured uplink grant activation or deactivation.

Type 1 and Type 2 are configured by RRC for a Serving Cell per BWP. Multiple configurations can be active simultaneously in the same BWP. For Type 2, activation and deactivation are independent among the Serving Cells.

RRC configures the following parameters when the configured grant Type 1 is configured:
cs-RNTI: CS-RNTI for retransmission;
periodicity: periodicity of the configured grant Type 1;
timeDomainOffset: Offset of a resource with respect to SFN=timeReferenceSFN in time domain;
timeDomainAllocation: Allocation of configured uplink grant in time domain which contains startSymbolAndLength or startSymbol;
nrofHARQ-Processes: the number of HARQ processes for a configured grant;
timeReferenceSFN: SFN used for determination of the offset of a resource in time domain. The UE uses the closest SFN with the indicated number preceding the reception of the configured grant configuration.
frequencyHopping: The value intraSlot enables 'Intra-slot frequency hopping' and the value interSlot enables 'Inter-slot frequency hopping'. If the field is absent, frequency hopping is not configured.
p0-PUSCH-Alpha: This field include an index indicating p0 value.

RRC configures the following parameters when the configured grant Type 2 is configured:
cs-RNTI: CS-RNTI for activation, deactivation, and retransmission;
periodicity: periodicity of the configured grant Type 2;
nrofHARQ-Processes: the number of HARQ processes for configured grant;

The cs-RNTI is included in PhysicalCellGroupConfig IE or SuspendConfig IE.

periodicity, timeDomainOffset, timeDomainAllocation, nrofHARQ-Processes, frequencyHopping, p0-PUSCH-Alpha, and timeReferenceSFN are included in an ConfiguredGrantConfig.

A ConfiguredGrantConfig IE can further include the sdt-P0-PUSCH field if the ConfiguredGrantConfig IE is included in the second part of SuspendConfig of RRCRelease message. The value indicated in the sdt-P0-PUSCH field instead of the value indicated in P0-PUSCH field in PUSCH-Config IE is applied for the initial transmission based on the configured grant in RRC_INACTIVE state.

A RRCReconfiguration message includes one PhysicalCellGroupConfig IE and a plurality of ConfiguredGrantConfig IEs.

A RRCRelease message includes zero or one cs-RNTI field. A RRCRelease message include zero or one or more ConfiguredGrantConfigs.

sdt-Config field includes an SDT-Config IE. The SDT-Config IE includes the following fields: a sdt-DRB-List, a sdt-SRB2-Indication, a sdt-MAC-PHY-CG-Config, a sdt-DRB-ContinueEHC.

sdt-DRB-ContinueEHC includes an IE indicating one of cell and rna. This field indicates whether the PDCP entity for the radio bearers configured for SDT continues or resets the EHC header compression protocol during PDCP re-establishment during the SDT procedure. Value cell indicates that ROHC header compression continues when the UE resumes for SDT in the same cell as the PCell when the RRCRelease message is received. Value rna indicates that EHC header compression continues when the UE resumes for SDT in a cell belonging to the same RNA as the PCell when the RRCRelease message is received. If the field is absent the PDCP entity for the radio bearers configured for SDT reset the EHC header compression protocol during PDCP re-establishment during the SDT procedure.

sdt-DRB-List includes zero or one or more DRB-Identities. This field indicates the ID(s) of the DRB(s) that are configured for SDT. If the size of the sequence is zero, then UE assumes that none of the DRBs are configured for SDT.

sdt-SRB2-Indication includes an IE indicating allowed. This field indicates whether SRB2 is configured for SDT or not. If the field is absent SRB2 is not configured for SDT.

sdt-MAC-PHY-CG-Config field includes an SDT-MAC-PHY-CG-Config IE. The SDT-MAC-PHY-CG-Config IE includes the following fields: a cg-SDT-Config-LCH-restrictionToAddModList, a cg-SDT-Config-Initial-BWP-NUL, a cg-SDT-Config-Initial-BWP-SUL, a cg-SDT-Config-Initial-BWP-DL, a cg-SDT-TimeAlignmentTimer, a cg-SDT-RSRP-ThresholdSSB, a C-RNTI, and a CS-RNTI.

cg-SDT-Config-LCH-restrictionToAddModList includes one or more CG-SDT-Config-LCH-restriction IEs. A CG-SDT-Config-LCH-restriction IE includes a logicalChannelIdentity field and a configuredGrantType1Allowed field. The CG-SDT-Config-LCH-restriction IE indicates whether the logical channel indicated by the logicalChannelIdentity field is allowed to use a type1 configured grant or not.

cg-SDT-Config-Initial-BWP-NUL includes a BWP-Uplink-Dedicated-SDT IE.

cg-SDT-Config-Initial-BWP-SUL includes a BWP-Uplink-Dedicated-SDT IE.

The BWP-Uplink-Dedicated-SDT IE includes a PUSCH-Config IE and a ConfiguredGrantConfigToAddModList IE.

The PUSCH-Config IE is used to configure the UE specific PUSCH parameters applicable to the initial BWP of the first cell.

The ConfiguredGrantConfigToAddModList IE includes one or more ConfiguredGrantConfigToAddMod IEs.

cg-SDT-Config-Initial-BWP-DL includes a BWP-Downlink-Dedicated-SDT IE. The BWP-Downlink-Dedicated-SDT IE includes a PDCCH-Config IE and a PDSCH-Config IE.

The PDCCH-Config IE is used to configure the UE specific PDCCH parameters applicable to the initial BWP of the first cell.

The PDSCH-Config IE is used to configure the UE specific PDSCH parameters applicable to the initial BWP of the first cell.

cg-SDT-TimeAlignmentTimer includes a TimeAlignmentTimer IE. This field indicates the TAT value for CG-SDT.

cg-SDT-RSRP-ThresholdSSB includes a RSRP-Range IE. This field indicates an RSRP threshold configured for the SSB selection for CG-SDT.

C-RNTI includes a RNTI-value IE. This field indicates RNTI value for dynamic grant and dynamic assignment to be used during CG-SDT. C-RNTI indicated in this field is valid for dynamic grants in the normal uplink of the first cell and in the supplemental uplink of the first cell and for dynamic assignment in the downlink of the first cell.

CS-RNTI includes an RNTI-value IE. This field indicates RNTI value for type1 configured grant to be used during CG-SDT. CS-RNTI indicated in this field is valid for type1 configured grants in the normal uplink of the first cell and in the supplemental uplink of the first cell.

RNTI-value IE represents a Radio Network Temporary Identity. It indicates an integer between 0(=0000 0000 0000 0000) and 65535 (=1111 1111 1111 1111)

If SDT-Config without sdt-MAC-PHY-CG-Config is included in the RRCRelease, the UE considers RA-SDT is configured. The UE also considers RA-SDT is applicable in the third cell. The third cell is the cell where SIB1 including SDT-ConfigCommonSIB is broadcast.

If SDT-Config with sdt-MAC-PHY-CG-Config is included in the RRCRelease, the UE considers CG-SDT is configured. The UE also considers CG-SDT applicable in the first cell and RA-SDT is applicable in the third cell. The first cell is the PCell when RRCRelease message including SDT-Config is received.

The sdt-ConfigCommon field includes following fields: a sdt-RSRP-Threshold field and a sdt-DataVolumeThreshold field and a sdt-CQI-Threshold field.

sdt-RSRP-Threshold indicates the RSRP threshold for the UE to determine whether to perform SDT1 procedure.

sdt-DataVolumeThreshold indicates data volume threshold used to determine whether SDT1 can be initiated.

sdt-CQI-Threshold indicates the channel quality threshold for the UE to determine whether to perform SDT2 procedure.

Alternatively, sdt-CQI-Threshold is included in the first paging message. In this case, the corresponding entry2 in the second list includes the first information and the second information and the sdt-CQI-Threshold.

The operations of the terminal and the base station are explained below.

The terminal transmits, to a base station, a UECapabilityInformation. The UECapabilityInformation includes a zero or one ra-SDT (Type1 SDT) field and a zero or one or more cg-SDT fields. The ra-SDT field indicates whether the terminal supports the transmission of data over allowed radio bearers in RRC_INACTIVE state via Random Access procedure. Each of a zero or one or more cg-SDT (Type2 SDT) field indicates whether the terminal supports transmission of data over allowed radio bearers in RRC_INACTIVE state via configured grant type1 in an associated frequency band.

The terminal transmits to an AMF a NAS message. The NAS message includes a UE NETWORK CAPABILITY IE. The UE NETWORK CAPABILITY IE contains plurality of octets. A specific bit of a specific octet indicates whether the UE supports RRC CONNECTION RESUME3 or not.

The terminal transmits, to a base station, a UECapabilityInformation. The UECapabilityInformation includes information on ra-SDT (Type1 SDT) support and information on cg-SDT (Type2 SDT) support.

The terminal transmits to an AMF a NAS message. The NAS message includes a bit indicating whether RRC CONNECTION RESUME3 is supported or not.

The terminal, if TYPE2 RRC CONNECTION RESUME3 and TYPE2 RRC CONNECTION RESUME2 and TYPE1 RRC CONNECTION RESUME2 are supported by the terminal, includes the information on Type1 SDT support and the information on Type2 SDT support in the UECapabilityInformation and sets the bit in the NAS message to a first value.

The terminal, if TYPE2 RRC CONNECTION RESUME3 and TYPE2 RRC CONNECTION RESUME2 are supported but TYPE1 RRC CONNECTION RESUME2 is not supported by the terminal, includes the information on Type 1 SDT support and does not include the information on Type2 SDT support in the UECapabilityInformation and sets the bit in the NAS message to a first value.

The terminal, if TYPE1 RRC CONNECTION RESUME2 and TYPE2 RRC CONNECTION RESUME2 are supported but TYPE2 RRC CONNECTION RESUME3 is not supported by the terminal, includes the information on Type1 SDT support and the information on Type2 SDT support in the UECapabilityInformation and sets the bit in the NAS message to a second value.

The terminal, if TYPE2 RRC CONNECTION RESUME2 is supported but TYPE2 RRC CONNECTION RESUME3 and TYPE1 RRC CONNECTION RESUME2 are not supported by the terminal, includes the information on ra-SDT support and does not include the information on cg-SDT support in the UECapabilityInformation and sets the bit in the NAS message to a second value.

Terminal receives, from a base station, an RRCRelease. The RRCRelease suspends the RRC connection and includes a SuspendConfig. The SuspendConfig includes a first UE identifier, a second UE identifier, a t380, and a sdt-Config. The sdt-Config includes a sdt-DRB-List, a sdt-SRB2-Indication, and a sdt-MAC-PHY-CG-Config.

The sdt-MAC-PHY-CG-Config includes a cg-SDT-ConfigInitialBWP-NUL, a cg-SDT-ConfigInitialBWP-SUL, a cg-SDT-ConfigInitialBWP-DL, a cg-SDT-TimeAlignmentTimer, a cg-SDT-RSRP-ThresholdSSB, and a cg-SDT-CS-RNTI.

Terminal performs, in response to the reception of the RRCRelease, a first set of actions (UE actions upon RRCRelease reception).

The first set of actions includes releasing a zero or more first configured grants (the zero or more first configured grants are the configured grants having been configured and having not been cleared when the RRCRelease is received) and determining zero or one or more DRBs to be configured for SDT based on the sdt-DRB-List and determining whether SRB2 is configured for SDT based on the sdt-SRB2-Indication and configuring a zero or more second configured grants (the zero or more second configured grants are indicated in a configuredGrantConfigToAddModList in the cg-SDT-ConfigInitialBWP-NUL and in a configuredGrantConfigToAddModList in the cg-SDT-ConfigInitialBWP-SUL) and starting the cg-SDT-TimeAlignmentTimer and starting T380, the T380 timer value is set to the t380.

Terminal receives a paging message in the paging channel of the second cell. The paging message includes a first list and a second list, the first list includes a one or more entry1s and the second list includes a one or more entry2s.

Each of the one or more entry Is includes either a first UE identifier or a third UE identifier.

Each of the one or more entry2s is either a type1 entry2 or a type2 entry2. The type1 entry2 consists of a first information indicating that the entry is entry2. The type2 entry2 consists of the first information and a second information. The second information indicates that the paging is for RRC CONNECTION RESUME3.

The number of entry2s in the second list and the number of entry1s in the first list are the same. Entry2s in the second list and entry1s in the first list are listed in the same order.

If a first UE identifier included in an entry1 of the first list matches the terminal's stored first UE identifier, and if the second information is included in the corresponding entry2 of the second list, the terminal initiates an RRC CONNECTION RESUME3 with resumeCause set to a first value.

8 If a first UE identifier included in an entry1 of the first list matches the terminal's stored first UE identifier, and if the second information is not included in the corresponding entry2 of the second list, the terminal initiates a RRC CONNECTION RESUME1 with resumeCause set to a second value.

If a third UE identifier included in an entry1 of the first list matches the UE identity allocated by upper layers, terminal performs a first set of actions (UE actions upon going to RRC_IDLE). The first set of actions includes clearing a configured resource for CG-SDT (configured resources in configureGrantConfigToAddModList in RRCRelease) and stopping the T380.

The UE ID allocated by upper layers is indicated in a specific NAS message such as ATACH ACCEPT. The UE ID allocated by upper layers is NG-S-TMSI.

NG-5G-S-TMS is a temporary UE identity provided by the 5GC which uniquely identifies the UE within the tracking area.

If none of the entry Is in the first list matches neither terminal's stored first UE identifier nor the UE identity allocated by upper layers, the terminal continue to monitor the paging channel.

The terminal resumes a suspended RRC CONNECTION in the RRC CONNECTION RESUME1.

The terminal performs data and/or signalling transmission while remaining in RRC_INACTIVE in the RRC CONNECTION RESUME2 and in the RRC CONNECTION RESUME3. RRC CONNECTION RESUME2 is mobile originated procedure. RRC CONNECTION RESUME3 is mobile terminated procedure.

RRC CONNECTION RESUME1 is initiated by the reception of second paging message or initiated by the terminal.

RRC CONNECTION RESUME2 is initiated by the terminal.

RRC CONNECTION RESUME3 is initiated by reception of the first paging message.

The terminal initiates, if at least one condition of CONDITION SET1 is fulfilled, a RRC CONNECTION RESUME1. The CONDITION SET1 includes reception of a second paging message and T380 expiry and RNA change.

The second paging message includes a first UE identifier that matches with the stored first UE identifier in a first list and does not include a second information in a corresponding entry2 in a second list.

The terminal sets a resumeCause in a first CCCH SDU to one of a first predefined values, the first predefined values include mt-Access and mo-Signaling and mo-Data.

The terminal initiates, if all conditions of CONDITION SET2 are fulfilled, a RRC CONNECTION RESUME2. The CONDITION SET2 includes an UPPER LAYER CONDITION SET1 and a LOWER LAYER CONDITION SET.

The UPPER LAYER CONDITION SET1 includes the upper layer's request for RRC connection resumption and sdt-Config being configured and sdt-ConfigCommon being included in the SIB1 and all pending data in the uplink being mapped to the radio bearers configured for SDT.

The LOWER LAYER CONDITION SET includes data volume of the pending uplink data across all RBs configured for SDT being less than or equal to the sdt-Data Volume Threshold and RSRP of the downlink pathloss reference being higher than the sdt-RSRP-Threshold.

Terminal sets a resumeCause in the first CCCH SDU to one of a first predefined values, the first predefined values include mt-Access and mo-Signaling and mo-Data.

The terminal initiates, if all conditions of CONDITION SET3 are fulfilled, a RRC CONNECTION RESUME3. The CONDITION SET3 includes an UPPER LAYER CONDITION SET2.

The UPPER LAYER CONDITION SET2 includes reception of a first paging message and sdt-Config being configured and sdt-ConfigCommon being included in the SIB1 and no pending data in uplink except CCCH SDU.

The first paging message includes a first entry1 in a first list and a first entry2 in a second list. The first entry1 includes a first UE identifier that matches with the stored first UE identifier. The first entry2 includes a second information. The first entry2 corresponds to the first entry1. The order of the first entry1 in the first list is the same as the order of the first entry2 in the second list.

The terminal sets a resumeCause in the first CCCH SDU to a second predefined value. The second predefined value indicates RRC CONNECTION RESUME3.

The terminal initiates a RRC CONNECTION RESUME2 if a first UPPER LAYER CONDITION SET and LOWER LAYER CONDITION SET are fulfilled.

The terminal initiates a RRC CONNECTION RESUME3 if a second UPPER LAYER CONDITION SET is fulfilled.

The terminal initiates a RRC CONNECTION RESUME1 when RRC CONNECTION RESUME2 is triggered if the first UPPER LAYER CONDITION SET is not fulfilled, or a LOWER LAYER CONDITION SET is not fulfilled.

The terminal initiates a RRC CONNECTION RESUME1 when RRC CONNECTION RESUME3 is triggered if the second UPPER LAYER CONDITION SET is not fulfilled.

UPPER LAYER CONDITIONS SET is set of conditions that are checked in RRC layer.

LOWER LAYER CONDITION SET is set of conditions that are checked in MAC layer.

The terminal transmits, to the base station, a first MAC PDU if a RRC CONNECTION RESUME is initiated.

The first MAC PDU includes, if the RRC CONNECTION RESUME is a RRC CONNECTION RESUME2, a first MAC SDU and a second MAC SDU. The first MAC SDU includes a first CCCH SDU and the second MAC SDU includes a RLC PDU from a logical channel associated with a radio bearer configured for SDT.

The first MAC PDU includes, if the RRC CONNECTION RESUME is a RRC CONNECTION RESUME1, only a first MAC SDU. the first MAC SDU includes a first CCCH SDU.

The first MAC PDU includes, if the RRC CONNECTION RESUME is a RRC CONNECTION RESUME3, only a third MAC SDU. The third MAC SDU includes a second CCCH SDU.

The first CCCH SDU (RRCResumeRequest) includes a resumeCause field. The resumeCause field indicates one value selected from predefined first values. The predefined first values include emergency, mt-Access, and mo-Data.

The second CCCH SDU (RRCResumeRequest2) includes a resumeCause field. The resumeCause field indicates a predefined second value. The predefined second value indicates RRC CONNECTION RESUME3, the predefined second value is not equal to any value in the predefined first values.

The first CCCH SDU includes a first UE identifier and the second CCCH SDU includes a second UE identifier.

The second CCCH SDU includes a field related to downlink channel quality derived based on a specific SS/PBCH block.

The terminal initiates a Random Access procedure for a RRC CONNECTION RESUME.

The terminal selects, if a one or more features are applicable for this Random Access procedure, and if none of sets of Random Access resources are available for any feature of the one or more features applicable to the current Random Access procedure, a first set of Random Access resources for this Random Access procedure.

The first set of Random Access resources is not associated with any features of the one or more features for this Random Access procedure.

Terminal selects, if a one or more features are applicable for this Random Access procedure, and if one set of Random Access resources is available for all the features of the one or more features applicable to the current Random Access procedure, the set of Random Access resources for this Random Access procedure.

The terminal selects, if no feature is applicable for this Random Access procedure, a second set of Random Access resources for this Random Access procedure.

The second set of Random Access resources is not associated with any feature.

The RedCap feature is applicable for the current Random Access procedure if the terminal is a RedCap UE. A RedCap UE has reduced capabilities with the intention to have lower complexity with respect to non-RedCap UEs.

MSG3 repetition feature is applicable for the current Random Access procedure if the BWP for Random Access procedure is configured with the set(s) of Random Access resources with MSG3 repetition indication.

RESUME2 feature is applicable for the current Random Access procedure if the Random Access procedure is initiated for type2 RRC CONNECTION RESUME2.

A set of Random Access resources consists of a set of Random Access Preambles and a set of PRACH occasions. The set of Random Access Preambles is indicated in a associated parameter set2. The set of PRACH occasions is indicated in an associated parameter set1.

A set of Random Access resources is associated with a set of random access parameters. The parameter set1 is associated with one or more sets of Random Access resources. The parameter set2 is associated with a set of Random Access resources.

The parameter set1 is included in the first part of a first RACH-ConfigCommon. The first RACH-ConfigCommon includes a one or more FeatureCombinationPreambles IEs. A FeatureCombinationPreambles IE of the one or more FeatureCombinationPreambles IE in the first RACH-ConfigCommon is associated with the set of Random Access resources that is associated with the parameter set1.

The parameter set2 is included in a FeatureCombinationPreambles IE of the one or more FeatureCombinationPreambles IEs in the first RACH-ConfigCommon. The one or more FeatureCombinationPreambles IEs are included in the second part of the first RACH-ConfigCommon. The parameter set2 is included in the second part of the first RACH-ConfigCommon.

The first part locates before the second part in the first RACH-ConfigCommon.

The first part is the non-extended part of the first RACH-ConfigCommon.

The second part is the extended part of the first RACH-ConfigCommon.

The terminal selects a SSB based on a rsrp-ThresholdSSB in a parameter set2.

The terminal selects a preamble group based on a ra-SizeGroupA, a messagePowerOffsetGroupB, and a numberOfRA-PreamblesGroupA.

The ra-SizeGroupA, the messagePowerOffsetGroupB, and the numberOfRA-PreamblesGroupA are included in a parameter set2.

The terminal selects the Random Access Preamble group B if the deltaPreamble is not present in a parameter set2 and if a potential Msg 3 size is greater than ra-SizeGroupA and the pathloss is less than PCMAX-preambleReceivedTargetPower-msg3-DeltaPreamble-messagePowerOffsetGroupB.

The terminal selects the Random Access Preamble group B if the deltaPreamble is present in the parameter set2 and if a potential Msg 3 size is greater than a ra-SizeGroupA and if the pathloss is less than PCMAX-preambleReceivedTargetPower-deltaPreamble-messagePowerOffsetGroupB.

msg3-DeltaPreamble is included in a PUSCH-ConfigCommon IE of initial uplink BWP of the selected uplink.

The preambleReceivedTargetPower is included in a parameter set1.

The deltaPreamble is included in a parameter set2.

The terminal selects the Random Access Preamble group B if a potential Msg 3 size is greater than ra-Msg3sizeGroupA and the pathloss is less than PCMAX-preambleReceivedTargetPower-msg3-DeltaPreamble-messagePowerOffsetGroupB and if parameter set2 (or FeatureCombinationPreambles IE) associated with the set of Random Access resources selected for this Random Access procedure is absent.

ra-Msg3sizeGroupA is included in the parameter set1.

The terminal selects a preamble based on the selected SSB and the selected preamble group.

The terminal transmits the selected preamble based on a preambleReceivedTargetPower and a DELTA_PREAMBLE.

The DELTA_PREAMBLE is determined based on a prach-ConfigurationIndex. The prach-ConfigurationIndex is included in a parameter set1.

The preambleReceivedTargetPower is included in a parameter set1.

The terminal monitors the PDCCH to receive RAR based on a ra-ResponseWindow.

The ra-ResponseWindow is included in a parameter set1.

Terminal determines the PUSCH transmission power for Msg 3 based on a first offset and pathloss and the number of PRBs.

The first offset is the sum of a preambleReceivedTargetPower and a msg3-DeltaPreamble if a deltaPreamble is not included in a parameter set1 of the current random access procedure.

The first offset is sum of a preambleReceivedTargetPower and a deltaPreamble. If a deltaPreamble is included in a parameter set1 of the current random access procedure.

The parameter set1 is associated with the first set of Random Access resources if the current random access procedure is initiated for RRC CONNECTION RESUME2. The parameter set1 is associated with the second set of Random Access resources if the current random access procedure is initiated for RRC CONNECTION RESUME3.

The parameter set2 is associated with the first set of Random Access resources if the current random access procedure is initiated for RRC CONNECTION RESUME2. The parameter set2 is associated with the second set of Random Access resources if the current random access procedure is initiated for RRC CONNECTION RESUME3.

RESUME2 feature is applicable to the first set of Random Access resources. The FeatureCombination IE in the FeatureCombinationPreamble IE associated with the first set of Random Access resources includes RESUME2 field set to true.

RESUME2 feature is not applicable to the second set of Random Access resources. The FeatureCombination IE in the FeatureCombinationPreamble IE associated with the second set of Random Access resources does not includes RESUME2 field.

The terminal generates a Msg 3.

The Msg 3 includes a first MAC SDU if the current random access procedure is initiated for RRC CONNECTION RESUME1.

The Msg 3 includes a first MAC SDU and a second MAC SDU if the current random access procedure is initiated for RRC CONNECTION RESUME2.

The Msg 3 includes a third MAC SDU if the current random access procedure is initiated for RRC CONNECTION RESUME3. In this case, the Msg 3 includes information on downlink channel quality.

The first MAC SDU includes a RRCResumeRequest and the second MAC SDU includes a RLC PDU generated from a specific data radio bearer and the third MAC SDU includes a RRCResumeRequest2.

The first MAC SDU and the third MAC SDU are not ciphered. The second MAC SDU is ciphered based on the stored security key.

The terminal determines PUSCH transmission power based on a sdt-P0-PUSCH in a first ConfiguredGrantConfig and a p0-NominalWithoutGrant if the sdt-p0-PUSCH is present in the first ConfiguredGrantConfig and if the current random access procedure is initiated for type RRC CONNECTION RESUME2 (or type1 RRC CONNECTION RESUME3).

The p0-NominalWithoutGrant is included in a PUSCH-Config IE in a sdt-MAC-PHY-CG IE in an RRCRelease message.

The first ConfiguredGrantConfig IE is selected from the one or more ConfiguredGrantConfig IEs in a sdt-MAC-PHY-CG IE in the RRCRelease message.

The terminal determines the PUSCH transmission power based on a preambleReceivedTargetPower and a msg3-DeltaPreamble if a deltaPreamble is not included in a parameter set1 of the current random access procedure and if the current random access procedure is initiated for type2 RRC CONNECTION RESUME3.

The terminal determines the PUSCH transmission power based on a preambleReceivedTargetPower and a deltaPreamble if a deltaPreamble is included in a parameter set1 of the current random access procedure and if the current random access procedure is initiated for type2 RRC CONNECTION RESUME3.

The terminal monitors PDCCH with a first RNTI if RRC CONNECTION RESUME1 is ongoing.

The terminal monitors PDCCH with a second RNTI if type RRC CONNECTION RESUME2 is ongoing.

The terminal monitors PDCCH with a third RNTI if type2 RRC CONNECTION RESUME3 is ongoing.

The first RNTI is a temporary RNTI indicated to the terminal during a current random access procedure.

The second RNTI is indicated to the terminal in a RRCRelease.

The third RNTI is indicated to the terminal in a valid RAR.

One or more of the above features may also be implemented in the following example procedures.

A method may be performed by a wireless device. The wireless device may transmit, to a base station, a first Radio Resource Control (RRC) message, wherein the first RRC message comprises one or more capability parameters. The wireless device may receive, from the base station and via a first cell, a second RRC message that causes an RRC state transition, wherein the second RRC message comprises first configuration information for small data transmission (SDT). The wireless device may transition, based on the second RRC message, to an RRC inactive state. While the wireless device is in the RRC inactive state, the wireless device may perform at least one of the followings: initiating a first SDT procedure associated with a second cell; transmitting, via the second cell and based on a first random access resource, a first random access preamble associated with the first SDT procedure; transmitting, via the second cell, a third RRC message requesting a first RRC connection resumption, wherein a resume cause field of the third RRC message is set to a first value of a plurality of resume cause field values; transmitting, via the second cell, data associated with the first SDT procedure; initiating a second SDT procedure associated with the second cell; transmitting, via the second cell and based on a second random access resource, a second random access preamble; transmitting, via the second cell, a fourth RRC message requesting a second RRC connection resumption, wherein a resume cause field of the fourth RRC message is set to a second value, and wherein the second value indicates that the second RRC connection resumption is for the second SDT procedure; and receiving, via the second cell, data associated with the second SDT procedure.

The wireless device may receive system information, of the second cell, indicating the first random access resource and the second random access resource.

The first random access resource may be a random access resource configured for SDT; and the second random access resource may be a non-SDT random access resource that is not configured for SDT.

The initiating the first SDT procedure associated with the second cell may be based on: pending uplink data being mapped to radio bearers configured for SDT; a data volume of the pending uplink data across all radio bearers configured for SDT is less than or equal to a data volume threshold; and system information of the second cell comprising second configuration information for SDT.

The second configuration information for SDT comprises: a downlink threshold for the first SDT procedure; a downlink threshold for the second SDT procedure; and a data volume threshold for the first SDT procedure.

The initiating the second SDT procedure associated with the second cell may be based on: a paging message received via the second cell while the wireless device is in the RRC inactive state; the paging message comprising information relating to SDT; and system information of the second cell comprising second configuration information for SDT.

The second configuration information for SDT comprises: a downlink threshold for the first SDT procedure; a downlink threshold for the second SDT procedure; and a data volume threshold for the first SDT procedure.

The first configuration information for SDT comprises: a list of data radio bearer (DRB) identities indicating DRBs configured for SDT; and an indicator relating to signaling radio bearer2 (SRB2) indicating that SRB2 is configured for SDT.

The first configuration information for SDT further comprises: configuration information for configured grant-small data transmission (CG-SDT) for normal uplink; and configuration information for CG-SDT for supplementary uplink; and a configured scheduling-radio network temporary identifier (CS-RNTI).

The initiating the first SDT procedure associated with the second cell is based on at least one parameter of the first configuration information for SDT; and the initiating the second SDT procedure associated with the second cell is based on at least one parameter of the first configuration information for SDT.

The first RRC message comprises: an information element regarding support of random access-based SDT; and an information element regarding support of configured grant (CG)-based SDT.

The second RRC message further comprises: a first wireless device identifier for paging reception and for common control channel (CCCH) transmission; and a timer value for t380 that controls periodic RRC connection resumption.

The third RRC message further comprises: a resume identity field comprising the first wireless device identifier.

The fourth RRC message further comprises: a resume identity field comprising the first wireless device identifier.

The first SDT procedure is for uplink SDT transmission, wherein the first value is selected from a first set of predetermined values, wherein the first set of predetermined values comprises mt-Access, mo-Signaling, and mo-Data, and wherein the first set of predetermined values does not comprise the second value.

Figure 3A:
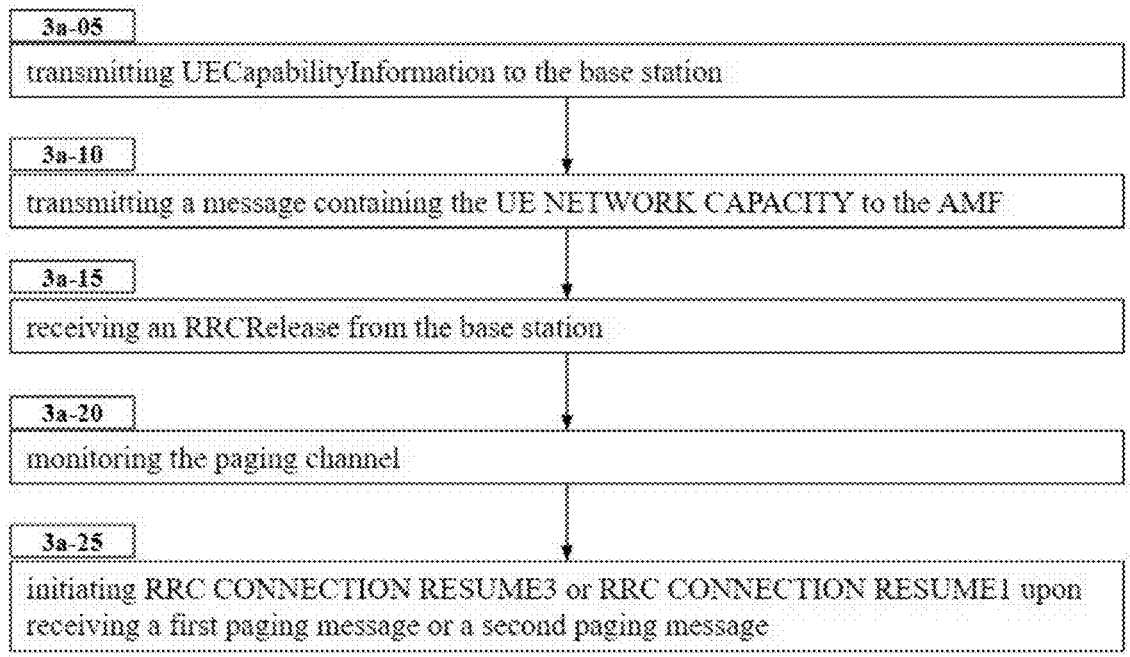
FIG. 3A is a flow diagram illustrating operations of a terminal and a base station according to an embodiment of the present invention.

More detailed examples of one or more of the above features are further illustrated below. FIG. 3A is a flow diagram illustrating an example operation of a terminal.

In step 3A-05, the terminal may transmit wireless device capability information (e.g., UECapabilityInformation) to the base station. The UECapabilityInformation may include type-1 SDT support information and type-2 SDT support information.

In step 3A-10, the terminal may transmit a message containing a wireless device network capability (e.g., the UE NETWORK CAPABILITY) to the AMF. Specific bits in the UE NETWORK CAPABILITY may indicate whether an RRC connection resumption (e.g., RRC CONNECTION RESUME3) is supported.

In step 3A-15, the terminal may receive an RRC release message (e.g., an RRCRelease) from the base station. The RRCRelease may comprise a suspend configuration (e.g., a SuspendConfig). In response to receiving the RRCRelease message, the terminal may enter into the RRC_INACTIVE state and perform a cell selection.

In step 3A-20, the terminal may monitor the paging channel in the selected cell.

In step 3A-25, if the terminal receives the first paging message from the cell, the terminal may initiate the RRC CONNECTION RESUME3. If the terminal receives the second paging message, the terminal may initiate the RRC CONNECTION RESUME1.

A first paging message may be a paging message in which the first UE identifier contained in entry1 of the first list matches the stored first UE identifier of the terminal. The second information may be a paging message contained in the corresponding entry2 of the second list. The first MAC PDU transmitted by the terminal in the RRC CONNECTION RESUME3 may contain a second CCCH SDU and the second predefined value may be set in the resumeCause field of said second CCCH SDU. The second paging message may include a first UE identifier contained in entry1 of the first list that matches the stored first UE identifier of the terminal. A paging message in which the second information is not contained in the corresponding entry2 of the second list may be received.

In RRC CONNECTION RESUME2, the first MAC PDU transmitted by the terminal may contain the first CCCH SDU and the resumeCause field of the first CCCH SDU may be set to one of the first predefined values.

Figure 4A:
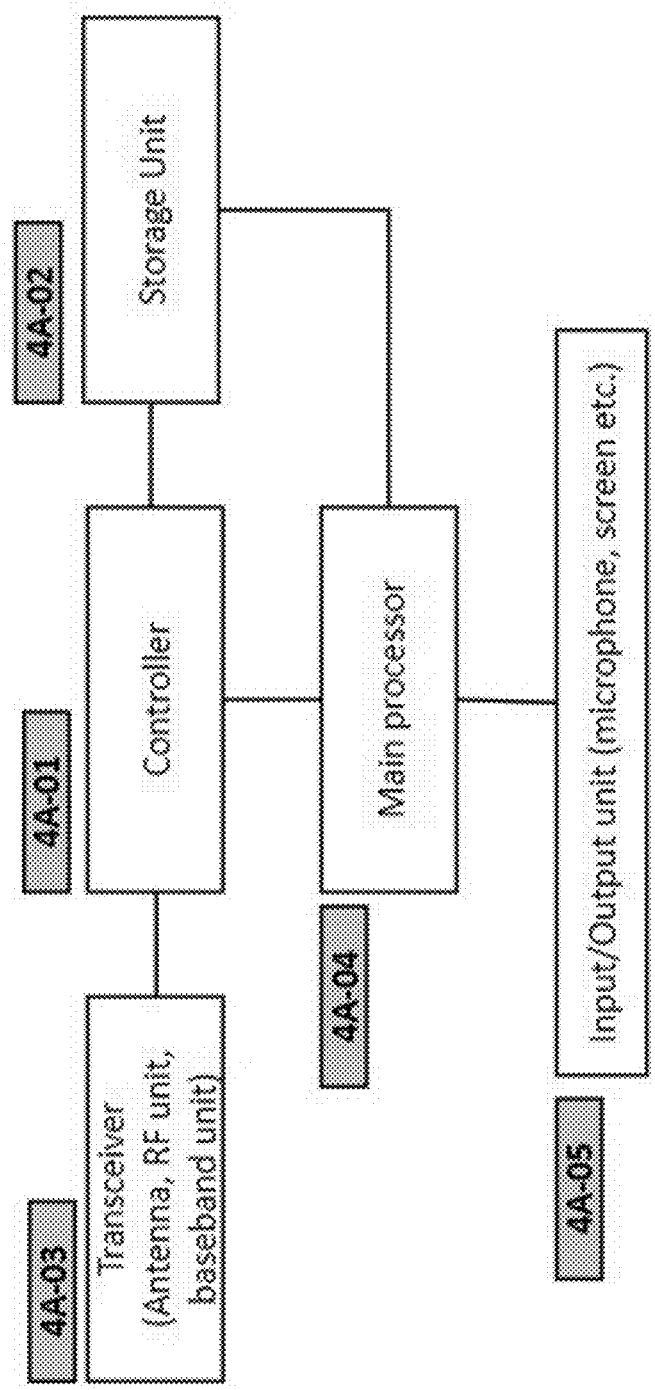
FIG. 4A is a block diagram illustrating an example internal structure of a UE according to the disclosure.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 may control the overall operations of the UE in terms of mobile communication. For example, the controller 4A-01 may receive/transmit signals through the transceiver 4A-03. In addition, the controller 4A-01 may record and read data in the storage unit 4A-02. To this end, the controller 4A-01 may include at least one processor. For example, the controller 4A-01 may include a communication processor (CP) that performs control for communication and an application processor (AP) that controls the upper layer, such as an application program. The controller may control storage unit and transceiver such that UE operations illustrated in FIG. 2A and FIG. 2B and FIG. 3A are performed.

The storage unit 4A-02 may store data for the operation of the UE, such as a basic program, an application program, and configuration information. The storage unit 4A-02 may provide the stored data at a request of the controller 4A-01.

The transceiver 4A-03 may consist of a RF processor, a baseband processor and plurality of antennas. The RF processor may perform functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor may perform a function of conversion between a baseband signal and a bit string according to the physical layer specification of the system. For example, during data transmission, the baseband processor may encode and modulate a transmission bit string, thereby generating complex symbols. In addition, during data reception, the baseband processor may demodulate and decode a baseband signal provided from the RF processor, thereby restoring a reception bit string.

The main processor 4A-04 may control the overall operations other than the mobile operation. The main processor 4A-04 may process user input received from the I/O unit 4A-05, stores the data in the storage unit 4A-02, controls the controller 4A-01 for required mobile communication operations and forwards the user data to the I/O unit (4A-05).

The I/O unit 4A-05 may consist of the equipment for inputting user data and for outputting user data such as a microphone and a screen. The I/O unit 4A-05 may perform the input and output of user data based on the main processor's instruction.

Figure 4B:
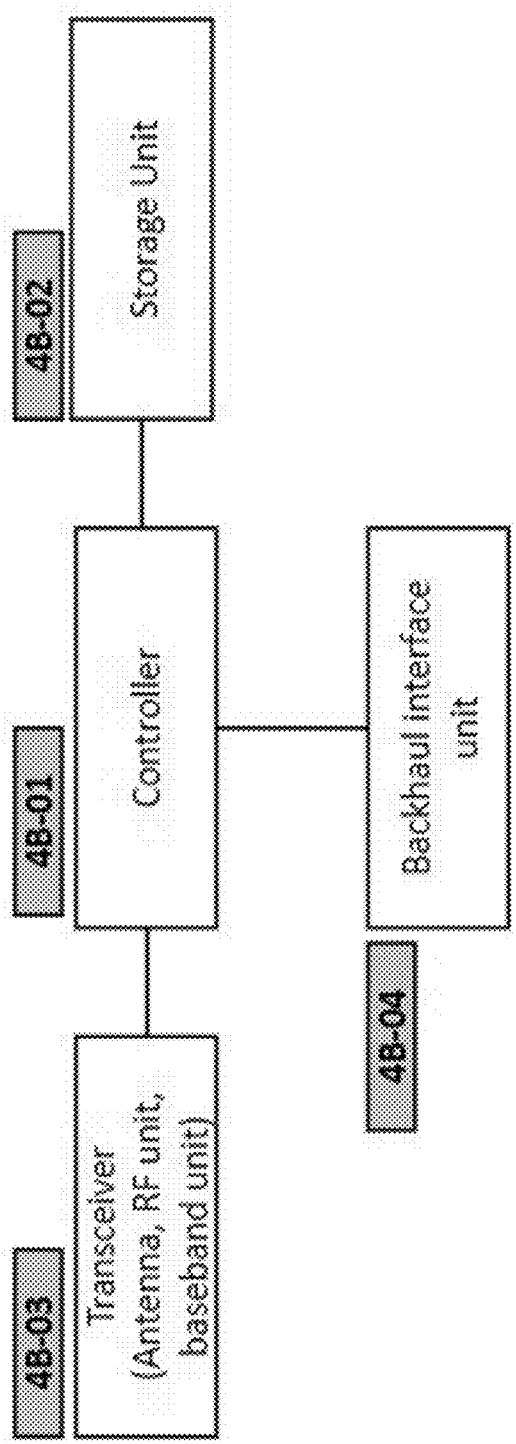
FIG. 4B is a block diagram illustrating an example configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 may control the overall operations of the main base station. For example, the controller 4B-01 may receive/transmit signals through the transceiver 4B-03, or through the backhaul interface unit 4B-04. In addition, the controller 4B-01 may record and read data in the storage unit 4B-02. To this end, the controller 4B-01 may include at least one processor. The controller may control the transceiver, storage unit and backhaul interface such as that base station operation illustrated in FIG. 2A and FIG. 2B are performed.

The storage unit 4B-02 may store data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 may provide stored data at the request of the controller 4B-01.

The transceiver 4B-03 may consist of a RF processor, a baseband processor and plurality of antennas. The RF processor may perform functions for the transmitting/receiving of signals through a wireless channel, such as signal band conversion, amplification, and the like. Specifically, the RF processor up—may convert a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor may perform a function of conversion between a baseband signal and a bit string according to the physical layer specification of the first radio access technology. For example, during data transmission, the baseband processor may encode and modulate a transmission bit string, thereby generating complex symbols. In addition, during data reception, the baseband processor may demodulate and decode a baseband signal provided from the RF processor, thereby restoring a reception bit string.

The backhaul interface unit 4B-04 may provide an interface for communicating with other nodes inside the network. The backhaul interface unit 4B-04 may convert a bit string transmitted from the base station to another node, for example, another base station or a core network—into a physical signal and converts a physical signal received from the other node into a bit string.

What is claimed is:

1. A method performed by a base station, the method comprising:
   receiving, from a wireless device via a first cell of the base station, a first Radio Resource Control (RRC) message, wherein the first RRC message comprises one or more capability parameters;
   transmitting, to the wireless device, at least one second RRC message that causes an RRC state transition to an RRC inactive state, wherein the at least one second RRC message comprises first configuration information for small data transmission (SDT); and
   while the wireless device is in the RRC inactive state:
   receiving, via a second cell of the base station and based on a first random access resource, a first random access preamble associated with a first SDT procedure;
   receiving, from the wireless device via the second cell, a third RRC message requesting a first RRC connection resumption, wherein a resume cause field of the third RRC message is set to a first value of a plurality of resume cause field values;
   receiving, via the second cell, data associated with the first SDT procedure;
   receiving, from the wireless device via the second cell, a fourth RRC message requesting a second RRC connection resumption, wherein a resume cause field of the fourth RRC message is set to a second value, and wherein the second value indicates that the second RRC connection resumption is for a second SDT procedure different from the first SDT procedure; and
   transmitting, via the second cell, data associated with the second SDT procedure.

2. The method of claim 1, further comprising:
   receiving, via the second cell and based on a second random access resource, a second random access preamble; and
   transmitting system information, of the second cell, indicating:
   the first random access resource; and
   the second random access resource.

3. The method of claim 2, wherein:
   the first random access resource is a random access resource configured for SDT; and
   the second random access resource is a non-SDT random access resource that is not configured for SDT.

4. The method of claim 1, wherein the first SDT procedure is initiated based on:
   pending uplink data being mapped to radio bearers configured for SDT;
   a data volume of the pending uplink data across all radio bearers configured for SDT being less than or equal to a data volume threshold; and
   system information of the second cell comprising second configuration information for SDT.

5. The method of claim 4, wherein the second configuration information for SDT comprises:
   a downlink threshold for the first SDT procedure;
   a downlink threshold for the second SDT procedure; and
   a data volume threshold for the first SDT procedure.

6. The method of claim 1, wherein the second SDT procedure is initiated based on:
   a paging message transmitted via the second cell while the wireless device is in the RRC inactive state;
   the paging message comprising information relating to SDT; and
   system information of the second cell comprising second configuration information for SDT.

7. The method of claim 6, wherein the second configuration information for SDT comprises:
   a downlink threshold for the first SDT procedure;
   a downlink threshold for the second SDT procedure; and
   a data volume threshold for the first SDT procedure.

8. The method of claim 1, wherein the first configuration information for SDT comprises:
   a list of data radio bearer (DRB) identities indicating DRBs configured for SDT; and
   an indicator relating to signaling radio bearer2 (SRB2) indicating that SRB2 is configured for SDT.

9. The method of claim 8, wherein the first configuration information for SDT further comprises:
   configuration information for configured grant-small data transmission (CG-SDT) for normal uplink; and
   configuration information for CG-SDT for supplementary uplink; and
   a configured scheduling-radio network temporary identifier (CS-RNTI).

10. The method of claim 1, wherein:
    the first SDT procedure is initiated based on at least one parameter of the first configuration information for SDT; and
    the second SDT procedure is initiated based on at least one parameter of the first configuration information for SDT.

11. The method of claim 1, wherein the first RRC message comprises:
    an information element regarding support of random access-based SDT; and
    an information element regarding support of configured grant (CG)-based SDT.

12. The method of claim 1, wherein the at least one second RRC message further comprises:
a first wireless device identifier for paging reception and for common control channel (CCCH) transmission; and
a timer value for t380 that controls periodic RRC connection resumption.

13. The method of claim 12, wherein the third RRC message further comprises:
a resume identity field comprising the first wireless device identifier.

14. The method of claim 12, wherein the fourth RRC message further comprises:
a resume identity field comprising the first wireless device identifier.

15. The method of claim 1, wherein the first SDT procedure is for uplink SDT transmission,
wherein the first value is selected from a first set of predetermined values, wherein the first set of predetermined values comprises mt-Access, mo-Signaling, and mo-Data, and
wherein the first set of predetermined values does not comprise the second value.

16. A base station comprising:
a transceiver,
a memory, and
a controller coupled to the transceiver and the memory, wherein the controller is configured to cause the base station to:
receive, from a wireless device via a first cell of the base station, a first Radio Resource Control (RRC) message, wherein the first RRC message comprises one or more capability parameters,
transmit, to the wireless device, at least one second RRC message that causes an RRC state transition to an RRC inactive state, wherein the at least one second RRC message comprises first configuration information for small data transmission (SDT); and
while the wireless device is in the RRC inactive state:
receive, via a second cell of the base station and based on a first random access resource, a first random access preamble associated with a first SDT procedure;
receive, from the wireless device via the second cell, a third RRC message requesting a first RRC connection resumption, wherein a resume cause field of the third RRC message is set to a first value of a plurality of resume cause field values;
receive, via the second cell, data associated with the first SDT procedure;
receive, from the wireless device via the second cell, a fourth RRC message requesting a second RRC connection resumption, wherein a resume cause field of the fourth RRC message is set to a second value, and wherein the second value indicates that the second RRC connection resumption is for a second SDT procedure different from the first SDT procedure; and
transmit, via the second cell, data associated with the second SDT procedure.

17. The base station of claim 16, wherein the controller is further configured to cause the base station to:
receive, via the second cell and based on a second random access resource, a second random access preamble;
transmit system information, of the second cell, indicating:
the first random access resource; and
the second random access resource,
wherein the first random access resource is a random access resource configured for SDT; and
wherein the second random access resource is a non-SDT random access resource that is not configured for SDT.

18. The base station of claim 16, wherein the first SDT procedure is initiated based on:
pending uplink data being mapped to radio bearers configured for SDT;
a data volume of the pending uplink data across all radio bearers configured for SDT being less than or equal to a data volume threshold; and
system information of the second cell comprising:
a downlink threshold for the first SDT procedure; and
a data volume threshold for the first SDT procedure.

19. The base station of claim 16, wherein the second SDT procedure is initiated based on:
a paging message transmitted via the second cell while the wireless device is in the RRC inactive state;
the paging message comprising information relating to SDT; and
system information of the second cell comprising:
a downlink threshold for the second SDT procedure.

20. The base station of claim 16, wherein the at least one second RRC message further comprises:
a first wireless device identifier for paging reception and for common control channel (CCCH) transmission; and
a timer value for t380 that controls periodic RRC connection resumption,
wherein the third RRC message further comprises a resume identity field comprising the first wireless device identifier; and
wherein the fourth RRC message further comprises a resume identity field comprising the first wireless device identifier.

* * * * *